(12) United States Patent
Wood et al.

(10) Patent No.: US 12,427,575 B2
(45) Date of Patent: *Sep. 30, 2025

(54) MODEL PREDICTIVE CONTROL (MPC) FOR CONTROLLING INTERNAL TEMPERATURE DISTRIBUTIONS WITHIN PARTS BEING MANUFACTURED VIA THE POWDER BED FUSION PROCESS

(71) Applicant: Ohio State Innovation Foundation, Columbus, OH (US)

(72) Inventors: Nathaniel Joseph Wood, Columbus, OH (US); David John Hoelzle, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 286 days.

This patent is subject to a terminal disclaimer.

(21) Appl. No.: 18/054,534

(22) Filed: Nov. 10, 2022

(65) Prior Publication Data
US 2023/0201927 A1 Jun. 29, 2023

Related U.S. Application Data

(63) Continuation-in-part of application No. 17/075,866, filed on Oct. 21, 2020, now Pat. No. 11,498,131.
(Continued)

(51) Int. Cl.
*B22F 10/28* (2021.01)
*B22F 10/85* (2021.01)
(Continued)

(52) U.S. Cl.
CPC ............. *B22F 10/28* (2021.01); *B22F 10/85* (2021.01); *G05B 13/041* (2013.01);
(Continued)

(58) Field of Classification Search
CPC ........ B22F 10/28; B22F 10/85; B22F 10/366; B22F 2999/00; B22F 10/38; B22F 10/36;
(Continued)

(56) References Cited

U.S. PATENT DOCUMENTS 11,498,131 B2 * 11/2022 Wood ...................... B22F 10/28
2018/0304370 A1 * 10/2018 Myerberg .......... G05B 19/4099
2020/0341062 A1 * 10/2020 Wang ....................... H02P 23/14

OTHER PUBLICATIONS

Beckett, Darren, "In-Situ Process Mapping using Thermal Quality Signatures™ during Additive Manufacturing with Titanium Alloy Ti-6Al-4V", Sigma Labs, Apr. 9, 2018.
(Continued)

*Primary Examiner* — Michael J Brown
(74) *Attorney, Agent, or Firm* — Meunier Carlin & Curfman LLC

(57) ABSTRACT

Estimation algorithms, methods, and systems are provided that estimate the internal temperatures inside of a part being built using powder bed fusion (PBF). Closed-loop state estimation is applied to the problem of monitoring temperature fields within parts during the PBF build process. A simplified linear time-invariant (LTI) model of PBF thermal physics with the properties of stability, controllability and observability is presented. In some aspects, Model Predictive Control (MPC) may be used as an expanded application of an Ensemble Kalman Filter (EnKF) methods to control the PBF process. MPC is used to forecast the PBF build process behavior N time steps into the future and identifies inputs that drive the temperature of a corresponding node in a mesh of n nodes towards a predetermined target temperature.

20 Claims, 11 Drawing Sheets

Related U.S. Application Data

(60) Provisional application No. 62/923,753, filed on Oct. 21, 2019.

(51) Int. Cl.
     *G05B 13/04* (2006.01)
     *B33Y 10/00* (2015.01)
     *B33Y 50/02* (2015.01)

(52) U.S. Cl.
     CPC .............. *G05B 13/048* (2013.01); *B33Y 10/00* (2014.12); *B33Y 50/02* (2014.12)

(58) Field of Classification Search
     CPC ........ B22F 10/80; B22F 10/368; B22F 12/90; G05B 13/041; G05B 13/048; G05B 19/4099; G05B 2219/49007; G05B 2219/49023; B33Y 10/00; B33Y 50/02; B33Y 30/00; B33Y 50/00; Y02P 10/25
     USPC ........................................................ 700/117
     See application file for complete search history.

(56) References Cited

OTHER PUBLICATIONS

Bhavar, Valmik, et al. "A review on powder bed fusion technology of metal additive manufacturing." Additive manufacturing handbook (2017): 251-253.

Brandl, Erhard, et al. "Mechanical properties of additive manufactured titanium (Ti-6A1-4V) blocks deposited by a solid-state laser and wire." Materials & Design 32.10 (Dec. 2011): 4665-4675.

Chen, Linear system theory and design, 3rd ed. New York, NY: Oxford University Press, 1999.

Cverna, Fran, ed. ASM Ready Reference: Thermal properties of metals. ASM International, 2002.

DebRoy, Tarasankar, et al. "Additive manufacturing of metallic components-process, structure and properties." Progress in Materials Science 92 (Mar. 2018): 112-224. (Available online Oct. 7, 2017).

Denlinger, Erik R., et al. "Thermal modeling of Inconel 718 processed with powder bed fusion and experimental validation using in situ measurements." Additive Manufacturing 11 (Jul. 2016): 7-15.

Denlinger, Erik R., et al. "Thermomechanical model development and in situ experimental validation of the Laser Powder-Bed Fusion process." Additive Manufacturing 16 (Aug. 2017): 73-80.

Dullerud, et al., A Course in Robust Control Theory. Springer, 2000.

Dunbar, A. J., et al. "Development of experimental method for in situ distortion and temperature measurements during the laser powder bed fusion additive manufacturing process." Additive Manufacturing 12 (Oct. 2016): 25-30.

Evensen, Geir. "The ensemble Kalman filter: Theoretical formulation and practical implementation." Ocean dynamics 53.4 (2003): 343-367.

Franklin, Gene F., J. David Powell, and Michael L. Workman. Digital control of dynamic systems. vol. 3. Reading, MA: Addison-Wesley, 1998.

Gaikwad, Aniruddha, et al. "Toward the digital twin of additive manufacturing: Integrating thermal simulations, sensing, and analytics to detect process faults." IISE Transactions 52.11 (Jan. 24, 2020): 1204-1217.

Gillijns, Steven, and Bart De Moor. "Unbiased minimum-variance input and state estimation for linear discrete-time systems with direct feedthrough." Automatica 43.5 (Jan. 2007): 934-937.

Gokuldoss, Prashanth Konda, Sri Kolla, and Jürgen Eckert. "Additive manufacturing processes: Selective laser melting, electron beam melting and binder jetting—Selection guidelines." Materials 10.6 (Apr. 2017): 672.

Grasso, Marco, and Bianca Maria Colosimo. "Process defects and in situ monitoring methods in metal powder bed fusion: a review." Measurement Science and Technology 28.4 (Feb. 2017): 044005.

Heigel, J. C., P. Michaleris, and Edward William Reutzel. "Thermo-mechanical model development and validation of directed energy deposition additive manufacturing of Ti-6Al-4V." Additive manufacturing 5 (Jan. 2015): 9-19.

Keist, Jayme S., and Todd A. Palmer. "Role of geometry on properties of additively manufactured Ti-6Al-4V structures fabricated using laser based directed energy deposition." Materials & Design 106 (Sep. 2016): 482-494.

Kolossov, Serguei, et al. "3D FE simulation for temperature evolution in the selective laser sintering process." International Journal of Machine Tools and Manufacture 44.2-3 (Feb. 2004): 117-123.

Krol, T. A., et al. "Verification of structural simulation results of metal-based additive manufacturing by means of neutron diffraction." Physics Procedia 41 (Apr. 2013): 849-857.

Liu, Yi, and Brian DO Anderson. "Singular perturbation approximation of balanced systems." International Journal of Control 50.4 (1989): 1379-1405.

Marla, Deepak, Upendra V. Bhandarkar, and Suhas S. Joshi. "Models for predicting temperature dependence of material properties of aluminum." Journal of Physics D: Applied Physics 47.10 (Feb. 2014): 105306.

Megahed, M., Mindt, HW., Willems, J. et al. LPBF Right the First Time-the Right Mix Between Modeling and Experiments. Integr Mater Manuf Innov 8, 194-216 (Apr. 18, 2019). https://doi.org/10.1007/s40192-019-00133-8.

Mower, Todd M., and Michael J. Long. "Mechanical behavior of additive manufactured, powder-bed laser-fused materials." Materials Science and Engineering: A 651 (Jan. 2016): 198-213.

Mukherjee, Tridibesh, and Tarasankar DebRoy. "A digital twin for rapid qualification of 3D printed metallic components." Applied Materials Today 14 (Mar. 2019): 59-65. (Available online Nov. 17, 2018).

Parimi, Lakshmi L., et al. "Microstructural and texture development in direct laser fabricated IN718." Materials Characterization 89 (Mar. 2014): 102-111.

Peng, Hao, et al. "Fast prediction of thermal distortion in metal powder bed fusion additive manufacturing: Part 1, a thermal circuit network model." Additive Manufacturing 22 (Jun. 20, 2018): 852-868.

Peng, Hao, et al. "Fast prediction of thermal distortion in metal powder bed fusion additive manufacturing: Part 2, a quasi-static thermo-mechanical model." Additive Manufacturing 22 (Aug. 2018): 869-882.

Peralta, A. D., et al. "Towards rapid qualification of powder-bed laser additively manufactured parts." Integrating Materials and Manufacturing Innovation 5.1 (May 5, 2016): 154-176.

Peyre, P., et al. "Analytical and numerical modelling of the direct metal deposition laser process." Journal of Physics D: Applied Physics 41.2 (Jan. 2008): 025403.

Plati, A., et al. "Residual stress generation during laser cladding of steel with a particulate metal matrix composite." Advanced engineering materials 8.7 (Jul. 2006): 619-624.

Raghavan, A., et al. "Heat transfer and fluid flow in additive manufacturing." Journal of Laser Applications 25.5 (Aug. 2013): 052006.

Rich, Alan. "Shielding and guarding." Analog Dialogue 17.1 (1983): 8-13.

Ridwan, S., et al. "Automatic layerwise acquisition of thermal and geometric data of the electron beam melting process using infrared thermography." in Proceedings of the Annual International Solid Freeform Fabrication Symposium, Austin, TX, 2014, pp. 343-352.

Roberts, Ibiye Aseibichin, et al. "A three-dimensional finite element analysis of the temperature field during laser melting of metal powders in additive layer manufacturing." International Journal of Machine Tools and Manufacture 49.12-13 (Oct. 2009): 916-923.

Roger, C. R., S. H. Yen, and K. G. Ramanathan. "Temperature variation of total hemispherical emissivity of stainless steel AISI 304." JOSA 69.10 (1979): 1384-1390.

Rombouts, Marleen, et al. "Photopyroelectric measurement of thermal conductivity of metallic powders." Journal of Applied physics 97.2 (2005): 024905. [Online]. Available: https://doi.org/10.1063/1.1832740.

(56) References Cited

OTHER PUBLICATIONS

Samar, Raza, et al., "Model reduction with balanced realizations." International Journal of Control 62.1 (1995): 33-64.

Škatarić, Dobrila, and Nada Ratković-Kovačević. "The system order reduction via balancing in view of the method of singular perturbation." FME Transactions 38.4 (2010): 181-187.

Tóth, Roland, et al. "Crucial aspects of zero-order hold LPV state-space system discretization." IFAC Proceedings vols. 41.2 (Jul. 2008): 4952-4957.

Wang, T., et al. "Grain morphology evolution behavior of titanium alloy components during laser melting deposition additive manufacturing." Journal of Alloys and Compounds 632 (May 2015): 505-513.

Wei, H. L., J. W. Elmer, and T. DebRoy. "Origin of grain orientation during solidification of an aluminum alloy." Acta Materialia 115 (Aug. 2016): 123-131.

Wood, Nathaniel, and David Hoelzle. "Temperature states in Powder Bed Fusion additive manufacturing are structurally controllable and observable." arXiv preprint arXiv:2001.02519 (Jan. 7, 2020).

Wood, Nathaniel, and David J. Hoelzle. "On the feasibility of a temperature state observer for powder bed fusion additive manufacturing." 2018 Annual American Control Conference (ACC). IEEE, Jun. 27-29, 2018. pp. 321-328.

Wood, Nathaniel, et al. "Interrogation of mid-build internal temperature distributions within parts being manufactured via the powder bed fusion process." Proceedings of the 2019 Annual International Solid Freeform Fabrication Symposium. (Aug. 1, 2019).

Touloukian and D. DeWitt, Thermophysical Properties of Matter. IFI/Plenium, 1970, vol. 7, ch. 3, p. 1210.

Yadollahi, Aref, et al. "Effects of process time interval and heat treatment on the mechanical and microstructural properties of direct laser deposited 316L stainless steel." Materials Science and Engineering: A 644 (Sep. 2015): 171-183.

Yang, Zhuo, et al. "Investigating grey-box modeling for predictive analytics in smart manufacturing." ASME 2017 International Design Engineering Technical Conferences and Computers and Information in Engineering Conference. American Society of Mechanical Engineers Digital Collection, Aug. 6-9, 2017, Cleveland, Ohio, USA.

\* cited by examiner

MODEL PREDICTIVE CONTROL (MPC) FOR CONTROLLING INTERNAL TEMPERATURE DISTRIBUTIONS WITHIN PARTS BEING MANUFACTURED VIA THE POWDER BED FUSION PROCESS

CROSS-REFERENCE TO RELATED APPLICATIONS

This application is a continuation-in-part of U.S. patent application Ser. No. 17/075,866, filed Oct. 21, 2020, entitled "Estimating Internal Temperature Distributions within Parts being Manufactured via the Powder Bed Fusion Process," and claims the benefit of U.S. Provisional Patent Application No. 62/923,753, filed on Oct. 21, 2019, entitled "Algorithm for Estimating Internal Temperature Distributions within Parts being Manufactured via the Powder Bed Fusion Process," the disclosures of which are expressly incorporated herein by reference in their entireties.

STATEMENT OF GOVERNMENT SUPPORT

This invention was made with government support under IIP 1738723 awarded by the National Science Foundation (NSF). This invention was made with government support under C.N. RX9-OSU-20-5-AFRL2 awarded by the Air Force Research Laboratory (AFRL). The government has certain rights in the invention.

BACKGROUND

Additive Manufacturing (AM) processes are a diverse set of automated manufacturing processes which build three-dimensional components in a layer-by-layer fashion though the selective addition of material. This forming strategy allows for fabricating features such as internal channels or fine lattice works that would be impractical or impossible to produce with traditional manufacturing processes, as well as eliminating most overhead costs associated with production. Furthermore, components fabricated by AM typically exhibit mechanical properties that meet or exceed those found in traditionally-manufactured components.

A class of AM processes is known as powder bed fusion (PBF). PBF is a type of AM technology that builds parts in a layer-by-layer fashion out of a bed of metal powder via the selective melting action of a laser or electron beam heat source. The PBF process performs the layer-wise AM fabrication of components in three stages: 1) sweeping a thin (20-100 micron) layer of powder over a base of metal feedstock or previously applied powder, 2) selectively melting a pattern of desired geometry into the powder by application of a high-powered laser or electron beam, and 3) lowering the build platform in the z direction to accommodate a fresh layer of powder.

The PBF process is not without flaws. It is well-known that components manufactured with PBF display high levels of residual stresses, porosity, and anisotropy in material properties. These defects are a direct consequence of the temperature throughout the component, which is manifested by cooling rates within the component interior and which could theoretically be used as a basis for process monitoring and control. For example, temperature history influences metallurgic phase formation which in turn influences mechanical properties and corrosion resistance; a complete temperature history would enable one to predict phases composition at all locations in a part. However, commercial PBF machines typically operate in the absence of advanced process monitoring tools or feedback control based on these internal cooling rates because the operation of these tools is contingent on adequate sensing. Cooling rates are inferred from temperature measurements at the part surface, if the PBF system is equipped with the correct sensor, or not inferred at all; direct internal temperature measurements is not possible during the PBF process. Temperature sensing must be remote as a thermocouple cannot be placed on the surface being built. Most commercial systems have a thermocouple built in to the built plate for chamber temperature regulation, but the temperature at the melting plane is hundreds of degrees Kelvin higher than at the build plate. Some research-grade PBF tools and some commercial systems, such as the Concept Laser M2, monitor the melt pool using a digital camera based pyrometer with an optical path that is concentric with the laser beam using sophisticated optics. Other commercial systems and a multitude of research PBF tools have used global-view digital camera based pyrometers to thermally image the top surface. Regardless of temperature sensing mode, thermal sensing is remote and, at present, there are no ways to measure temperature past the top layer being built; the sensing limitation is simple, fused metal is opaque to infrared transmission.

The application of thermal model-based process monitoring and control techniques could help detect and mitigate defects in the PBF process. Process monitoring suites offered by commercial PBF systems typically assess the presence of defects based on exhaustive calibrations that "train" the model to accept certain measured values as defect-free. Predictive model-based process monitoring with a minimum of necessary calibration remains elusive. Moreover, the demand is growing for closed loop process monitoring and control in PBF systems to replace the open loop architectures that exist today.

It is with respect to these and other considerations that the various aspects and embodiments of the present disclosure are presented.

SUMMARY

Estimation algorithms, methods, and systems are provided that estimate the internal temperatures inside of a part being built using powder bed fusion (PBF). Closed-loop state estimation is applied to the problem of monitoring temperature fields within parts during the PBF build process. A simplified linear time-invariant (LTD) model of PBF thermal physics with the properties of stability, controllability and observability is presented. In some aspects. an Ensemble Kalman Filter is applied to the model. Linear time-varying (LTV) systems are also contemplated.

In an implementation, a method of estimating the temperature distribution inside a part manufactured by powder bed fusion process is disclosed. The method may include discretizing the part geometry into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations; estimating the values of the variable set using a Kalman filter, using the set of ordinary differential equations, information on heat applied, an estimate of a noise distribution of the process, a measurement of a temperature of the part during the process at specific locations, and an estimate of a noise distribution in the temperature measurement; and outputting an estimate of the set of variables that are input to a model predictive control (MPC) to alter a set of control inputs to the power bed fusion process to drive the estimate to a predetermined target temperature field. A corresponding system is also disclosed herein.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
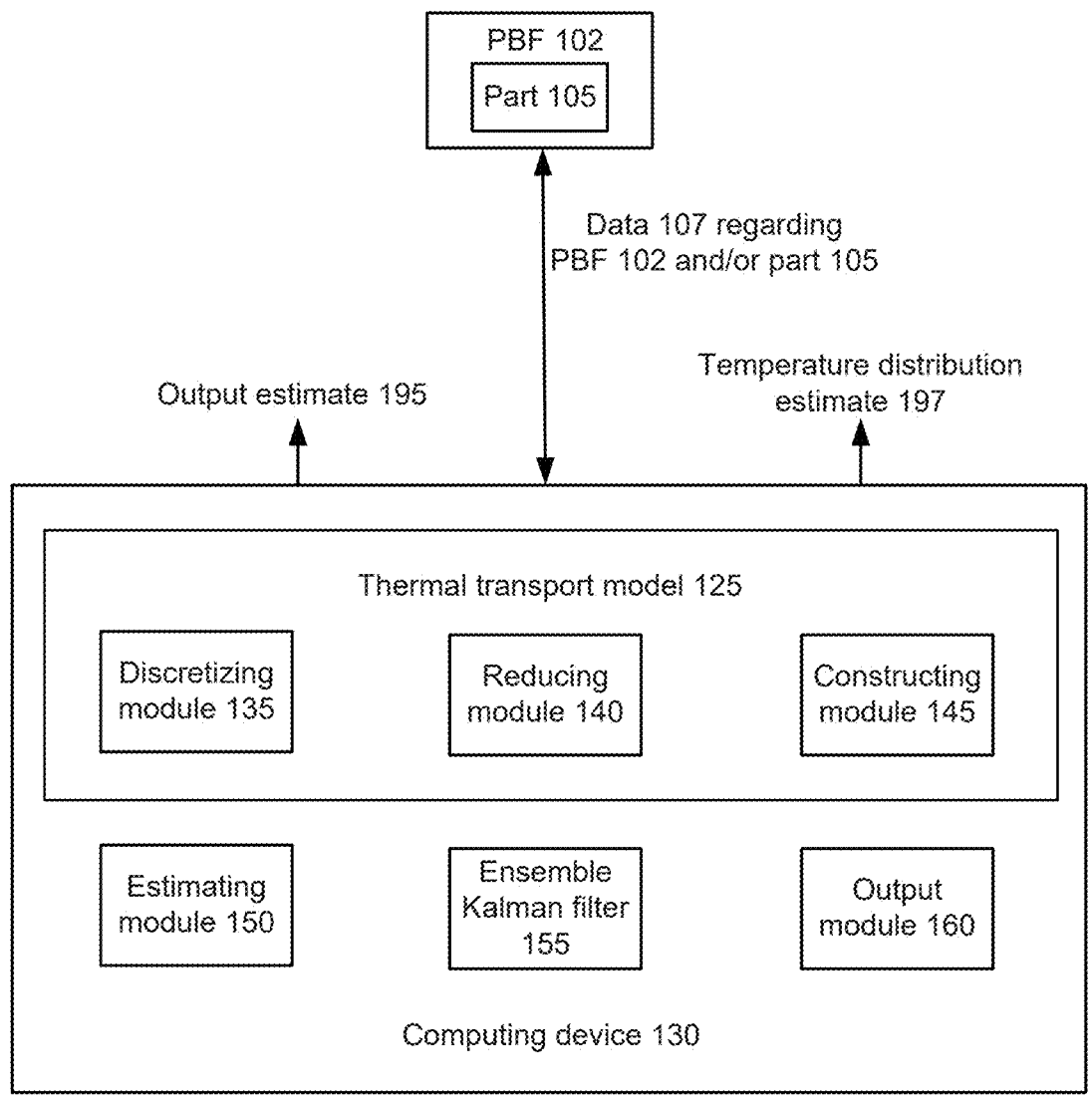
FIG. 1 is an illustration of an exemplary environment for estimating the temperature distribution inside a part manufactured by powder bed fusion.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Systems and methods are provided directed to predictive model-based process monitoring for power bed fusion (PBF). A linear time-invariant (LTI) state space model of PBF conductive heat transfer physics is described with established stability, controllability, and observability. This model is based on first principles and thus requires a minimum of training and/or calibration to perform. The model is reduced and expressed in discrete time, and a state estimator known as an ensemble Kalman filter (EnKF) is applied to the reduced-order model. Linear time-varying (LTV) systems are also contemplated. As with the LTI models, the LTV models are expressed in discrete time, but are not reduced prior to implementation of the EnKF.

A state observer is provided which estimates the time-varying surface and/or subsurface temperatures of components being manufactured via PBF. State observers belong to a class of algorithms which synthesize direct measurements of the available process inputs and outputs with a model which estimates the process states (which may be composed of measured and unmeasured states). This strategy forces the model predictions to conform to the measured system behavior and thus improves the prediction accuracy. Systems and methods described herein use the sub-class of state observers known as ensemble Kalman filters. Kalman filters acknowledge the reality that all processes involve some level of uncertainty and that this uncertainty produces model error which may be characterized with statistics, and therefore perform the state observer model/data prediction synthesis with statistical tools. An advantage provided by the EnKF is using sample statistics to avoid needing a priori knowledge of the system uncertainty statistics. Systems and methods described herein use a structure of the EnKF in order to accommodate uncertainty in PBF process inputs and incorporate the EnKF operation into the contexts of models of PBF thermal physics which are generated from finite element software. A filter algorithm described herein is designed to be integrated into a physical PBF system so that the model predictions may be used to accomplish process monitoring and control during the manufacture of components.

Several commercial applications are envisioned for the systems and methods described herein. An implementation is a signal processing tool that increases the utility of integrating additional sensing equipment into commercial PBF systems. As such, the systems and methods could be used by thermal camera manufacturers, who provide the sensing equipment, or by PBF manufacturers, who provide the PBF systems, to provide quality control and validation. For example, the temperature predictions supplied by the systems and methods could be used to predict microstructures, identify out-of-specification features (i.e., a type of fault detection scheme), or integrate into closed loop feedback systems. The systems and methods could also be used in a fault detection scheme in which temperature estimates that significantly deviate from the measured value would indicate the presence of defects, allowing the manufacturer to identify parts to be scrapped, or even better, abort a build early process to save manufacturing costs.

FIG. 1 is an illustration of an exemplary environment 100 for estimating the temperature distribution inside a part 105 manufactured by powder bed fusion 102. The environment 100 may include the PBF 102 manufacturing, the part 105 and a computing device 130. The computing device 130 may comprise a thermal transport model 125. The computing device 130 and the PBF 102 may be directly connected to one another or may be comprised within the same unit or system. In some implementations, the computing device 130 and the PBF 102 may be in communication through a network 120. The network 105 may be a variety of network types including the public switched telephone network (PSTN), a cellular telephone network, and a packet switched network (e.g., the Internet). Although only one PBF 102 and one computing device 130 are shown in FIG. 1, there is no limit to the number of PBFs and computing devices that may be supported.

Figure 13:
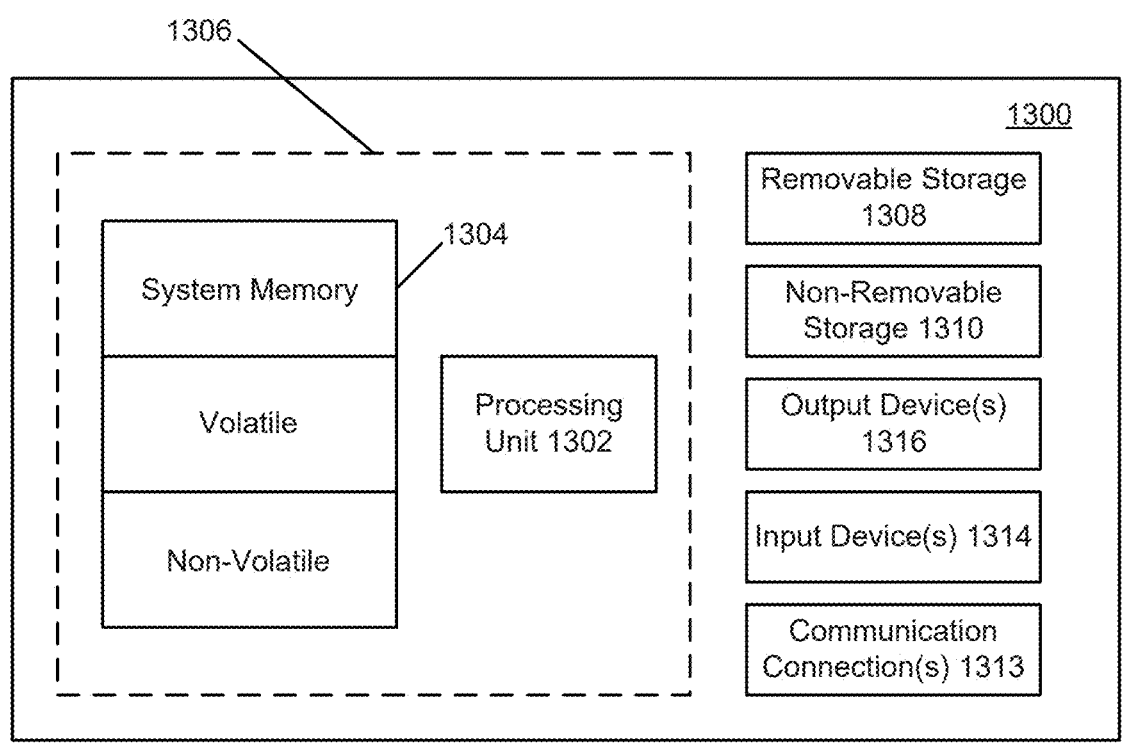
FIG. 13 shows an exemplary computing environment in which example embodiments and aspects may be implemented.

The computing device 130 may be implemented using a variety of computing devices such as desktop computers, laptop computers, tablets, etc. Other types of computing devices may be supported. A suitable computing device is illustrated in FIG. 13 as the computing device 1300.

The PBF 102 is configured to manufacture the part 105, and provide data 107 regarding the PBF 102 and/or the part 105 to the computing device 130 for use in processing and estimation as described further herein.

The computing device 130 uses the data 107 and the thermal transport model 125 to generate one or more outputs, such as an output estimate 195 and/or a temperature distribution estimate 197, as described further herein. The one or more outputs may be provided from the computing device 130 to the client device 110 and/or the PBF 102, depending on the implementation.

The computing device 130 comprises various modules including a discretizing module 135, a reducing module 140, a constructing module 145, an estimating module 150, an ensemble Kalman filter 155, and an output module 160. In some implementations, the discretizing module 135, the reducing module 140, and the constructing module 145 are comprised within the thermal transport model 125.

The discretizing module 135 is configured to discretize a geometry of the part 105 into finite units to convert the thermal transport model 125 for the part geometry into a set of ordinary differential equations that describes heat transport between elements. In an implementation, the discretizing defines a set of variables that represent temperature at specific spatial locations, using the thermal transport model 125 and thermal properties of the part 105 material as functions in the set of ordinary differential equations. These aspects are described further below.

The reducing module 140 is configured to reduce the number of ordinary differential equations in the set of ordinary differential equations via a change in variables of the ordinary differential equations as a linear combination of the set of variables, thus providing a transformed variable set. These aspects are described further below.

The constructing module 145 is configured to, in some implementations, construct a set of copies of the reduced set of ordinary differential equations with independent application of input and measured noise distribution. These aspects are described further below.

The estimating module 150 is configured to estimate the values of the transformed variable set using a Kalman filter, such as the ensemble Kalman filter 155, using the reduced set of ordinary differential equations, information on heat applied, an estimate of a noise distribution of the process, a measurement of a temperature of the top surface of the part 105 during the process at specific locations, and an estimate of a noise distribution in the temperature measurement. The estimating module 150 is also configured to compute an estimate of the set of variables by reversing the reduction of the number of ordinary differential equations. In the case of an LTV system, no reduction is applied, and the variable set is untransformed.

In some implementations, the estimating module 150 is configured to estimate the values of the transformed variable set and noise distributions of process and temperature measurement by using an ensemble Kalman filter, using the reduced set of ordinary differential equations, information on the heat applied, and a measurement of a temperature of the part during the process at specific locations. The estimating module 150 is also configured to compute an estimate of the set of variables and noise by reversing the reduction of the number of ordinary differential equations. In the case of an LTV system, no reduction is applied, and the variable set is untransformed. Aspects are described further below.

The output module 160 is configured to provide the output estimate 195 and/or a temperature distribution estimate 197 to an output device, such as an output device of the computing device 130. It is noted that the output estimate 195 differs from the temperature distribution estimate 197. The output estimate 195 is the estimate of the sensor value, as predicted by the output module 160. This is not the same as an estimation of the temperature distribution or even a subset of it. Depending on the implementation of the sensor choice, the sensor physical model, and the sensor operation, the output estimate 195 and the temperature distribution estimate 197 may have different units.

Figure 2:
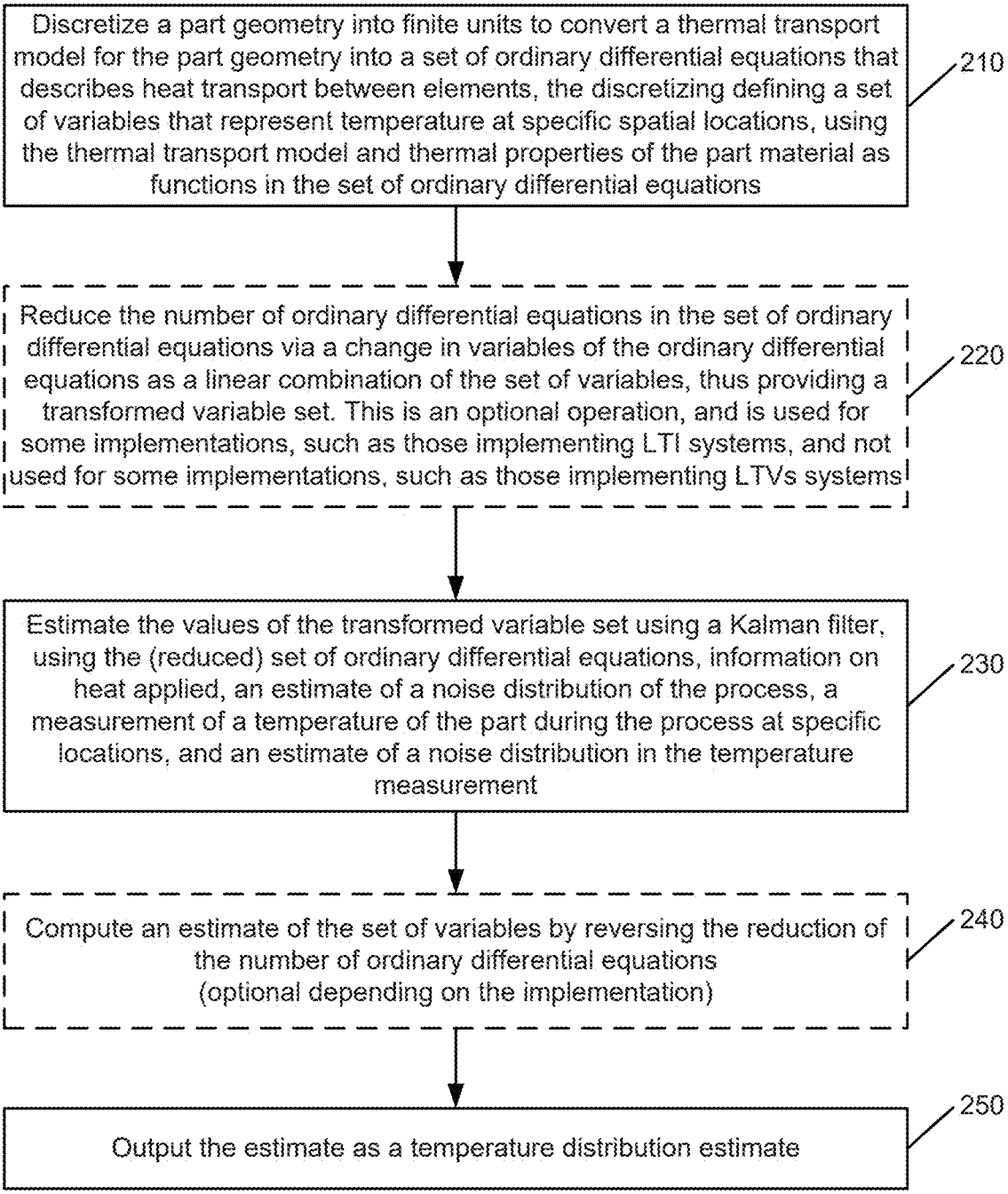
FIG. 2 is an operational flow of an implementation of a method of estimating the temperature distribution inside a part manufactured by powder bed fusion.

FIG. 2 is an operational flow of an implementation of a method 200 of estimating the temperature distribution inside a part manufactured by powder bed fusion. The method 200 may be performed using the environment 100 in some implementations.

At 210, using the discretizing module 135, discretize a part geometry into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations.

Optionally, in some implementations, at 220, using the reducing module 140, reduce the number of ordinary differential equations in the set of ordinary differential equations via a change in variables of the ordinary differential equations as a linear combination of the set of variables, thus providing a transformed variable set. This operation is optional depending on the implementation, as some implementations do not reduce the number of variables.

At 230, using the estimating module 150, estimate the values of the transformed variable set using a Kalman filter (e.g., from the ensemble Kalman filter 155), using the (reduced, in some implementations) set of ordinary differential equations, information on heat applied, an estimate of a noise distribution of the process, a measurement of a temperature of the part during the process at specific locations, and an estimate of a noise distribution in the temperature measurement.

Optionally (e.g., in the implementations in which the operations at 220 are performed), at 240, using the estimating module 150, compute an estimate of the set of variables by reversing the reduction of the number of ordinary differential equations. This operation is optional depending on the implementation, because if the reduction of 220 is not performed, then there is no reduction to be reversed.

At 250, using the output module 160, output the estimate as a temperature distribution estimate, such as the temperature distribution estimate 197.

Figure 3:
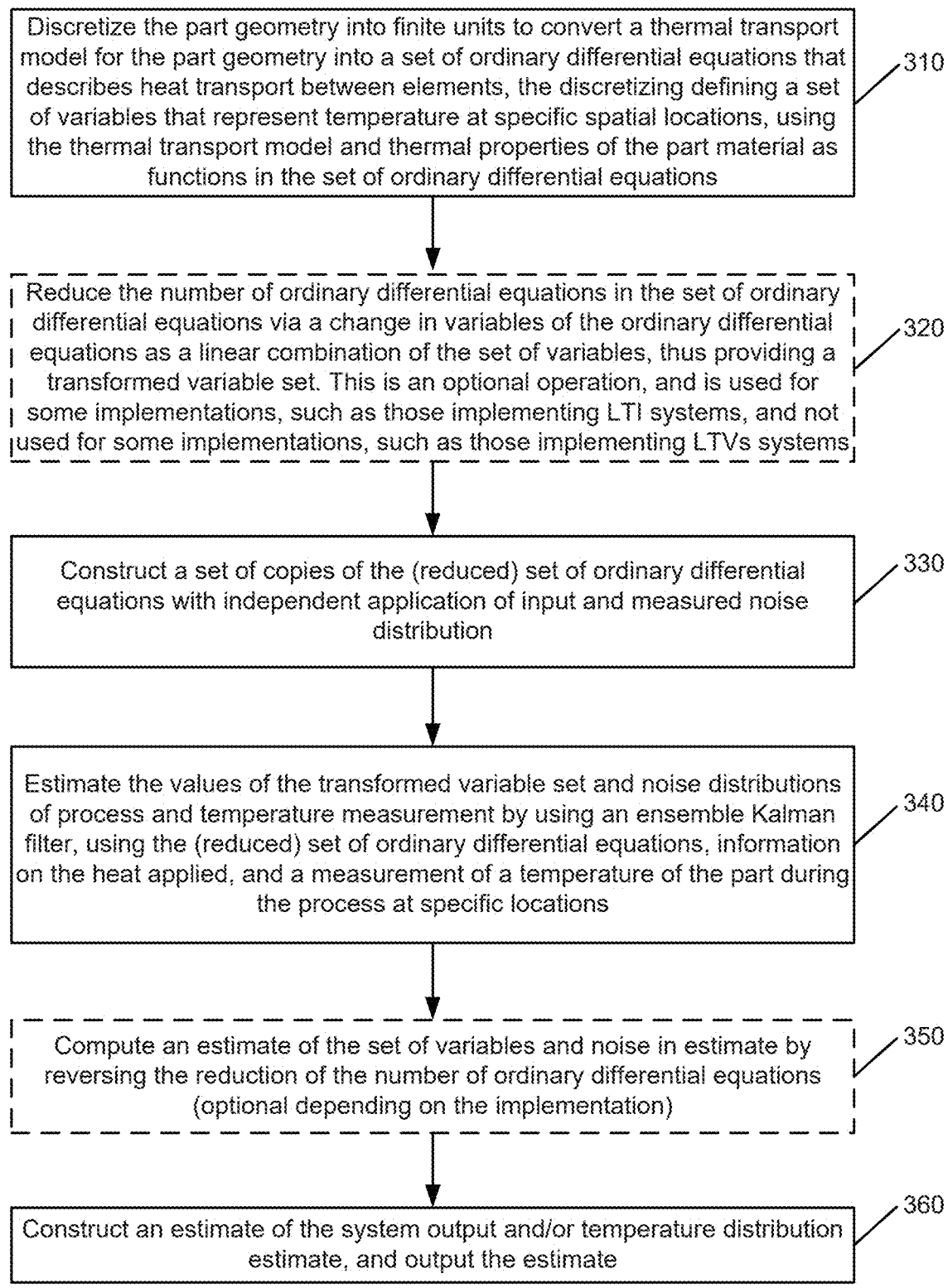
FIG. 3 is an operational flow of another implementation of a method of estimating the temperature distribution inside a part manufactured by powder bed fusion.

FIG. 3 is an operational flow of another implementation of a method 300 of estimating the temperature distribution inside a part manufactured by powder bed fusion. The method 300 may be performed using the environment 100 in some implementations.

At 310, using the discretizing module 135, discretize the part 105 geometry into finite units to convert a thermal transport model 125 for the part geometry into a set of ordinary differential equations that describes heat transport between elements, the discretizing defining a set of variables that represent temperature at specific spatial locations, using the thermal transport model and thermal properties of the part material as functions in the set of ordinary differential equations.

Optionally, in some implementations, at 320, using the reducing module 140, reduce the number of ordinary differential equations in the set of ordinary differential equations via a change in variables of the ordinary differential equations as a linear combination of the set of variables, thus providing a transformed variable set. This operation is optional depending on the implementation, as some implementations do not reduce the number of variables.

At 330, using the constructing module 145, construct a set of copies of the (reduced, in some implementations) set of ordinary differential equations with independent application of input and measured noise distribution.

At 340, using the estimating module 150, estimate the values of the transformed variable set and noise distributions of process and temperature measurement by using the ensemble Kalman filter 155, using the (reduced, in some implementations) set of ordinary differential equations, information on the heat applied, and a measurement of a temperature of the part during the process at specific locations.

Optionally (e.g., in the implementations in which the operations at 320 are performed), at 350, using the estimating module 150, compute an estimate of the set of variables and noise by reversing the reduction of the number of ordinary differential equations. This operation is optional depending on the implementation, as some implementations do not reduce the number of variables.

At 360, using the output module 160, construct an estimate of the system output and/or temperature distribution estimate (such as the temperature distribution estimate 197), and output the estimate(s).

An implementation of a computational algorithm of estimating the temperature distribution inside a part either being or was manufactured by powder bed fusion comprises: providing a computer model of the part geometry; providing a thermal transport model of heat and temperature both internal and external to the part domain; providing thermal properties of the part material; providing information on the heat applied to the top surface of the part during the process; providing an estimate of the noise distribution of the process; providing a measurement of the temperature of the part during the process at specific locations; providing an estimate of the noise distribution in the temperature measurement; discretization of the computer model of the part geometry into finite units to convert the thermal transport model for the part geometry into a set of ordinary differential equations that describes heat transport between elements, the discretization defining an original set of variables that represent temperature at specific spatial locations, using the thermal transport model and thermal properties of the part material as the underlying functions in the set of ordinary differential equations; reduction of the number of ordinary differential equations in the set of ordinary differential equations via a change in variables of the ordinary differential equations as a linear combination of the original variables in the set, thus providing a transformed variable set; estimation of the values of the transformed variable set by using a Kalman filter, using the provided reduced set of ordinary differential equations, information on the heat applied, estimate of the noise distribution of the process, measurement of the temperature of the part during the process at specific locations, and estimate of the noise distribution in the temperature measurement; and computing an estimate of the original set of variables by reversing the reduction of the number of ordinary differential equations. It is noted that in some implementations, such as LTV thermal transport models, no reduction occurs.

An implementation of a computational algorithm of estimating the temperature distribution inside a part either being or was manufactured by powder bed fusion comprises: providing a computer model of the part geometry; providing a thermal transport model of heat and temperature both internal and external to the part domain; providing thermal properties of the part material; providing information on the heat applied to the top surface of the part during the process; providing a measurement of the temperature of the part during the process at specific locations; discretization of the computer model of the part geometry into finite units to convert the thermal transport model for the part geometry into a set of ordinary differential equations that describes heat transport between elements, the discretization defining an original set of variables that represent temperature at specific spatial locations, using the thermal transport model and thermal properties of the part material as the underlying functions in the set of ordinary differential equations; reduction of the number of ordinary differential equations in the set of ordinary differential equations via a change in variables of the ordinary differential equations as a linear combination of the original variables in the set, thus providing a transformed variable set; constructing a set of copies of the reduced set of ordinary differential equations with independent process and measurement noise distributions; estimation of the values of the transformed variable set and the noise distributions of process and temperature measurement by using an ensemble Kalman filter, using the provided reduced set of ordinary differential equations, information on the heat applied, and measurement of the temperature of the part during the process at specific locations; and computing an estimate of the original set of variables and noise in the estimate by reversing the reduction of the number of ordinary differential equations. It is noted that in some implementations, such as LTV thermal transport models, no reduction occurs.

In some implementations, when the ensemble Kalman filter is implemented, the noise distributions that are used (e.g., added to the implementation(s)) are not derived from a priori knowledge, from experiments, or from other tests. Instead, they are dummy values that are directed to a guess or estimate as to what the noise might be. These noise values may be represented by $\Pi$ and $\Sigma$ of an example EnKF algorithm provided further herein.

An implementation of a device for estimating the temperature distribution inside a part manufactured by powder bed fusion is provided. The device is configured to: discretize a geometry of the part into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations; reduce the number of ordinary differential equations in the set of ordinary differential equations via a change in variables of the ordinary differential equations as a linear combination of the set of variables, thus providing a transformed variable set; estimate the values of the transformed variable set using a Kalman filter, using the reduced set of ordinary differential equations, information on heat applied, an estimate of a noise distribution of the process, a measurement of a temperature of the part during the process at specific locations, and an estimate of a noise distribution in the temperature measurement; and compute an estimate of the set of variables by reversing the reduction of the number of ordinary differential equations. It is noted that in some implementations, such as LTV thermal transport models, no reduction occurs.

An implementation of a device for estimating the temperature distribution inside a part manufactured by powder bed fusion is provided. The device is configured to: discretize a geometry of the part into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations; reduce the number of ordinary differential equations in the set of ordinary differential equations via a change in variables of the ordinary differential equations as a linear combination of the set of variables, thus providing a transformed variable set; construct a set of copies of the reduced set of ordinary differential equations with independent process and measurement noise distributions; estimate the values of the transformed variable set and noise distributions of process and temperature measurement by using an ensemble Kalman filter, using the reduced set of ordinary differential equations, information on the heat applied, and a measurement of a temperature of the part during the process at specific locations; and compute an estimate of the set of variables and noise in estimate by reversing the reduction of the number of ordinary differential equations. It is noted that in some implementations, such as LTV thermal transport models, no reduction occurs.

An implementation of a system for estimating the temperature distribution inside a part manufactured by powder bed fusion comprises: a processing module configured to: discretize a geometry of the part into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations; reduce the number of ordinary differential equations in the set of ordinary differential equations via a change in variables of the ordinary differential equations as a linear combination of the set of variables, thus providing a transformed variable set; construct a set of copies of the reduced set of ordinary differential equations with independent application of input and measured noise distribution; estimate the values of the transformed variable set and noise distributions of process and temperature measurement by using an ensemble Kalman filter, using the reduced set of ordinary differential equations, information on the heat applied, and a measurement of a temperature of the part during the process at specific locations; and compute an estimate of the set of variables and noise in estimate by reversing the reduction of the number of ordinary differential equations; and an output module configured to provide the estimate. It is noted that in some implementations, such as LTV thermal transport models, no reduction occurs.

In some implementations, the discretization of the volume is an adaptive mesh that changes over time in the model. In some implementations, the discretization is the finite element method. In some implementations, the discretization is the finite volume method. In some implementations, the discretization is the boundary element method. It is noted that an adaptive mesh does not preclude using finite elements.

In some implementations, the reduction of the number of ordinary differential equations is residualization. In some implementations, the reduction of the number of ordinary differential equations is balanced truncation. It is noted that in some implementations, like LTV systems, reduction cannot be done.

Some examples are now described. It is noted that these examples, and features and aspects therein, are for illustrative purposes only and the invention is not limited to these examples. Other implementations, such as those involving convection and radiation, may be used.

Regarding a PBF model, assumptions, and LTI construction, a simplified model of PBF thermal physics in which only Fourier conduction within the fused material is considered. The Fourier conduction boundary value problem (BVP) is stated in Equation (1):

$$\frac{\partial T}{\partial t} = \frac{K}{c\rho} \nabla^2 T \forall \xi \in V \qquad (1)$$

$$T = T_0 \forall \xi \in \Lambda$$

$$\nabla \cdot \hat{n} = 0 \forall \xi \in \Gamma$$

$$\nabla \cdot \hat{n} = q(\bar{\xi}, t) \forall \bar{\xi} \in \Omega.$$

K represents the material thermal conductivity, c represents the material specific heat, and ρ represents the material density. V represents the domain spanned by the (possibly unfinished) build, A collects all faces of the build in contact with the base plate, Ω collects all surfaces of the build exposed to the environment, and Γ collects all remaining faces. $T_0$ is the assumed-isothermal temperature of the base plate.

The BVP in Equation (1) is transformed into the linear state-space thermal model shown (a continuous LTI model) in Equation (2):

$$\dot{x}(t)=Ax(t)+Bu(t)$$

$$y(t)=Cx(t). \qquad (2)$$

A transformation is used to convert the partial differential equation (PDE) into a set of coupled ordinary differential equations (ODEs) via the Finite Element Method (FEM). Equation (2) is this set of ODEs. Each ODE governs the evolving temperature at a single node in the FEM mesh, and the system input is quantized to hold a constant value over each element surface belonging to Ω. In the thermal model of Equation (2), x collects the temperature signals at all nodes in the mesh, A maps the degree of conductive heat flow between nodes (0 for nonadjacent nodes), B maps the degree of distribution of laser energy input onto nodes located on Ω, and C selects the nodes belonging to Ω as system output in keeping with the assumption that only exposed faces of the build are available for measurement.

The thermal model of Equation (2) is unconditionally stable, stabilizable, and detectable, and is both structurally controllable and observable provided that at least one node in the FEM mesh exists on the exposed build surface. In fact, the system is not only structurally controllable and observable under this condition, it is fully controllable and observable. Thus, so long as a single node in the FEM mesh lays on the uppermost surface, Equation (2) is fully controllable and observable, if all eigenvalues of A are distinct. u(t) represents a quantized heat input over the FEM element faces on the top surface, and y(t) measures temperatures on the top surface.

Regarding model order reduction via balanced realization, the thermal model of Equation (2) mitigates the problem of model scale when attempting to represent PBF physics on the macroscale; however, the quantization of the system heat input can produce cumbersome node counts and therefore system sizes. Model order reduction (MOR) is used to reduce the impact of these issues. In an implementation, MOR may be performed via residualization.

The residualization algorithm requires stability, controllability and observability of the system.

The algorithm begins by performing the linear state transformation) z(t)=Tx(t), which puts the system in its balanced realization. The user then selects the first r (largest) Hankel Singular Values (HSVs) of the system, which are demonstrated in Equation (3). Each HSV is $\sqrt{\lambda_i(W_c W_o)}$; $\lambda_i$ denotes the $i^{th}$ eigenvalue of a matrix, and $W_c$ and $W_o$ are the controllability and observability grammians, respectively.

$$W = \text{diag}(\sigma_1 \geq \sigma_2 \geq \ldots \geq \sigma_n \geq 0). \tag{3}$$

The balanced realization of Equation (2) z(t)=Tx(t) is constructed, and the transformed system is divided into two parts, based on the relative magnitude of the HSVs.

Partitioning the HSVs in this manner also partitions z into two groups: $z_1 \in \mathbb{R}^r$ which constitute the "dominant" modes in the system input/output dynamics, and $z_2 \in \mathbb{R}^{n-r}$, which constitute the negligible modes. The partitioned system takes the form shown in Equation (4):

$$\begin{bmatrix} \dot{z}_1(t) \\ \dot{z}_2(t) \end{bmatrix} = \begin{bmatrix} A_{11} & A_{12} \\ A_{21} & A_{22} \end{bmatrix} \begin{bmatrix} z_1(t) \\ z_2(t) \end{bmatrix} + \begin{bmatrix} B_{11} \\ B_{22} \end{bmatrix} u(t) \tag{4}$$

$$y(t) = \begin{bmatrix} C_{11} & C_{22} \end{bmatrix} \begin{bmatrix} z_1(t) \\ z_2(t) \end{bmatrix}.$$

The residualization algorithm assumes that the "weak" modes stored in $z_2$ operate at quasi-steady state. In other words, it assumes that on the time scales of interest, $\dot{z}_2=0$. Thus, residualization proceeds by assuming $\dot{z}_2(t)=0$ for all $t \geq 0$. This assumption allows for the algebraic solution of $z_2$, which reduces Equation (4) to the form shown in Equation (5) (the reduced LTI system):

$$\dot{z}_1(t) = A_r z_1(t) + B_r u(t)$$

$$y(t) = C_r z_1(t) + D_r u(t)$$

$$z_2(t) = -A_{22}^{-1}(A_{21} z_1(t) + B_{22} u(t))$$

$$A_r = A_{11} - A_{12} A_{22}^{-1} A_{21}$$

$$B_r = B_{11} - A_{12} A_{22}^{-1} B_{21}$$

$$C_r = C_{11} - C_{22} A_{22}^{-1} A_{21}$$

$$D_r = -C_{22} A_{22}^{-1} B_{22}. \tag{5}$$

With residualization, one only needs to solve r coupled differential equations instead of n, and the original state x may be reconstituted during postprocessing by algebraically calculating $z_2$ and performing the inverse transformation $x = T^{-1}[z_1, z_2]'$. The (structural) controllability/observability of Equation (2) implies that Equation (5) is also (structurally) controllable and observable.

The state estimator design uses discretization of a continuous-time model. A Kalman filter is used to estimate the state of thermal model of Equation (2), which is implemented in discrete time.

In an implementation, a backward Euler discretization of the system is followed. Define discrete time steps as $t_k = k\Delta t$ for some fixed $\Delta t$. For notational convenience, $z_1(t_k) := z_{1,k}$. This discretization works by assuming:

$$\dot{z}_1(t_{k+1}) = \frac{z_{1,k+1} - z_{1,k}}{\Delta t}. \tag{6}$$

Equation (6) is substituted into Equation (2). With simplification, the following discrete-time system is obtained:

$$z_{1,k} = A_d z_{1,k-1} + B_d u_k \tag{7}$$

$$y_k = C_d z_{1,k} + D_d u_k$$

$$z_{2,k} = -A_{22}^{-1}(A_{21} z_{1,k} + B_{22} u_k)$$

$$A_d = (I - \Delta t A_r)^{-1}$$

$$B_d = \Delta t A_d B_r$$

$$C_d = C_r$$

$$D_d = D_r.$$

As $z_{1,k}$ (or its estimate) is computed, $z_{2,k}$ can be computed as a postprocessing step, or in parallel with the computation of $z_{1,k}$. They can be reassembled into $z_k = [z_{1,k}, z_{2,k}]'$. Once this is done, xx can be recovered with the transformation $x_k = T^{-1} z_k$.

In an implementation, an ensemble Kalman filter (EnKF) may be used. Effective implementation of a Kalman filter requires knowledge of the covariances of the process and measurement noise of the system under consideration. The state estimate covariance is denoted as P, and the measurement noise covariance is denoted as R. In some implementations, the model in Equation (7) is implementable for arbitrary build layer geometry V and under arbitrary external loading q(ξ, t). These constraints make the prediction of P intractable, while also limiting the utility of experimentally determining P due to the near-infinite variety of allowable geometric and loading conditions.

To overcome this limitation, a means is used of approximating P and R in-situ from the measured data y and reconstructed state estimate x. The Ensemble Kalman filter described further herein provides the optimal means of accomplishing this goal.

Within the context of reduced-order LTI systems, an implementation of an EnKF algorithm is as follows. An ensemble is generated:

$$Z_{1,k} = A_d \hat{Z}_{1,k-1} + B_d u_{k-1} 1_{1 \times N} + W_k; W_k = [w_k^1, \ldots, w_k^N], w_k^j \sim \mathcal{N}(0, \Pi) \tag{8}$$

$$Y_k = y_k 1_{1 \times N} + V_k; V_k = [v_k^1, \ldots, v_k^N], v_k^j \sim \mathcal{N}(0, \Sigma).$$

It is noted that the Π and Σ are dummy noise values described further herein.

Sample noise statistics are gathered as follows:

$$\bar{z}_{1,k} = \frac{1}{N}Z_{1,k}1_{N\times 1}, \bar{y}_k = \frac{1}{N}Y_k 1_{N\times 1} \quad (9)$$

$$\bar{P}_k^f = \frac{1}{N-1}(Z_{1,k} - \bar{z}_{1,k}1_{1\times N})(Z_{1,k} - \bar{z}_{1,k}1_{1\times N})'$$

$$\bar{R}_k = \frac{1}{N-1}(Y_k - \bar{y}_k 1_{1\times N})(Y_k - \bar{y}_k 1_{1\times N})'.$$

A Kalman filter is run on the ensemble as follows:

$$\tilde{Y}_k = Y_k - C_d Z_{1,k-1} - D_d u_k 1_{1\times N} \quad (10)$$

$$S_{k|k-1} = C_d \bar{P}_k^f C_d' + \bar{R}_k$$

$$K_k = \bar{P}_k^f C_d' S_{k|k-1}^{-1}$$

$$\hat{Z}_{1,k} = Z_{1,k} + K_k \tilde{Y}_k$$

$$\hat{z}_{1,k} = \frac{1}{N}\hat{Z}_{1,k} 1_{N-1}.$$

An implementation of an EnKF algorithm for an LTV embodiment is as follows. An ensemble is generated:

$$\hat{X}_{k|k-1} = A\hat{X}_{k-1|k-1} + B_k u_k 1_{1\times N} + J_k; J_k = [j_k^1, \ldots, j_k^N], j_k^i \sim \mathcal{N}(0, \Pi) \quad (11)$$

$$Y_k = y_k 1_{1\times N} + O_k; O_k = [o_k^1, \ldots, o_k^N], o_k^i \sim \mathcal{N}(0, \Sigma)$$

Sample noise statistics are gathered as follows:

$$\bar{x}_k = \frac{1}{N}\hat{X}_{k|k-1} 1_{N\times 1}, \bar{y}_k = \frac{1}{N}Y_k 1_{N\times 1} \quad (12)$$

$$\bar{P}_k^f = \frac{1}{N-1}(\hat{X}_{k|k-1} - \bar{x}_k 1_{1\times N})(\hat{X}_{k|k-1} - \bar{x}_k 1_{1\times N})'$$

$$\bar{R}_k = \frac{1}{N-1}(Y_k - \bar{y}_k 1_{1\times N})(Y_k - \bar{y}_k 1_{1\times N})'.$$

A Kalman filter is run on the ensemble as follows:

$$\tilde{Y}_k = Y_k - C_k \hat{X}_{k|k-1} \quad (13)$$

$$S_{k|k-1} = C_k \bar{P}_k^f C_k' + \bar{R}_k$$

$$K_k = \bar{P}_k^f C_k' S_{k|k-1}^{-1}$$

$$\hat{X}_{k|k} = \hat{X}_{k|k-1} + K_k \tilde{Y}_k$$

$$\hat{x}_{k|k} = \frac{1}{N}\hat{X}_{k|k} 1_{N\times 1}$$

Figure 4:
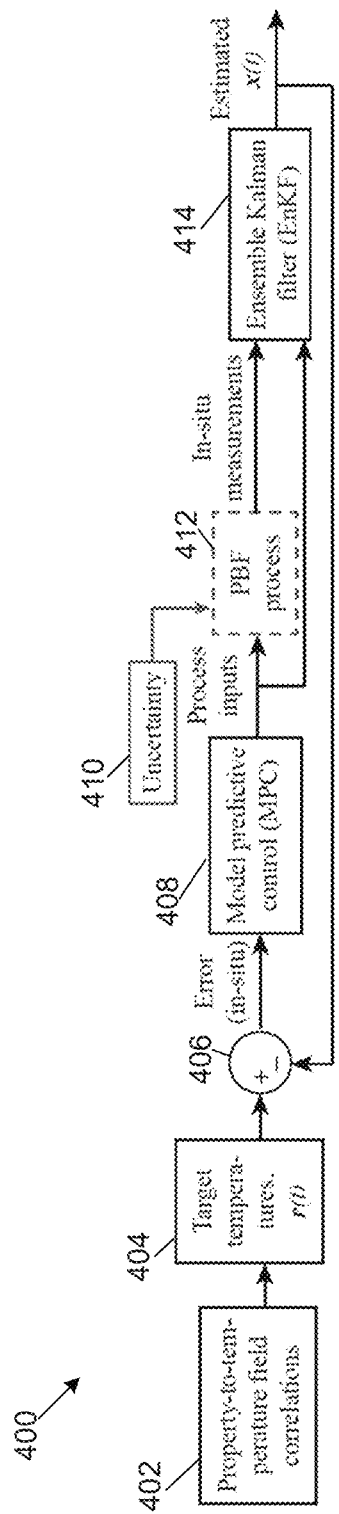
FIG. 4 illustrates an example application of Model Predictive Control (MPC) is in an Ensemble Kalman Filter (EnKF) based method.

Model Predictive Control (MPC) is an expanded application of the Ensemble Kalman Filter (EnKF) methods described above. FIG. 4 illustrates an example of how MPC fits into the EnKF-based method 400 of estimating internal temperatures. As a recap, $x(t) \in \mathbb{R}^n$ represents the internal temperature field 402 in the part, discretized by the finite element method (FEM). Each component of $x(t)$ is the temperature of the corresponding node in the mesh. Since direct measurement of internal temperatures is impossible, the EnKF algorithm (414) supplies estimates of $x(t)$ at discrete time steps k, denoted $\hat{x}_{k|k}$ at 406. Presuming these estimates are accurate, the MPC component 408 uses them as a basis to alter the prescribed set of control inputs to the powder bed fusion (PBF) 412 machine in (quasi-)real time in view of uncertainty 410 in PBF process inputs. The control inputs are altered to perform corrective action, as necessary, so that $\hat{x}_{k|k}$ is driven towards some predetermined target temperature field (404), r(t). Like the EnKF, MPC requires a model of the process. It functions by forecasting the process behavior N time steps into the future, and performing joint optimization (with constraints) over the spaces of process states and process inputs to identify those inputs which drive $\hat{x}_{k|k}$ towards r(t) as rapidly as possible while obeying constraints and hyperparameter selection. Hereafter, the process inputs will be denoted u(t). The components of u(t) differ based on whether a linear time-invariant (LTI) or linear time-varying (LTV) process model is considered. The implementation of MPC for both process models will be described below.

Initially, consider an LTI embodiment of MPC utilizing the continuous-time model (2). As a recap, $u(t) \in \mathbb{R}_m$ represents heat applied to the exposed surfaces of all elements on face $\Omega$ in the mesh, where $\Omega$ is the face of the part exposed to the laser (as described in the current application). $y(t) \in \mathbb{R}^p$ collects the temperatures recorded in each pixel of an infrared (IR) camera with a fixed FOV that covers all of $\Omega$. A describes heat conduction between nodes in the FEM mesh, B maps the laser heat onto the relevant nodes in the mesh, and C models the mapping between nodal temperatures and measurements. As described above, the process is sampled with a fixed time step, $\Delta t$, and therefore the process is modeled at discrete time instances $t_k = k\Delta t$, k=0,1,2, .... Hereafter, the subscript k denotes $t_k$, i.e. $x_k = x(t_k) = x(k\Delta t)$. Equation (14) is discretized with the backward Euler method, i.e.

$$\dot{x}_k = \frac{x_k - x_{k-1}}{\Delta t} \quad (15)$$

which produces an LTI discrete-time system that differs from (7), shown below:

$$x_k = \underbrace{(I_n - \Delta t A)^{-1}}_{A_d} x_{k-1} + \underbrace{\Delta t (I_n - \Delta t A)^{-1} B}_{B_d} u_k \quad (16)$$

$$y_k = C x_k$$

equation (16) is used as the basis for both the EnKF and MPC algorithms of FIG. 4. The EnKF is described above. We suppose that at time step k, the EnKF has already generated the estimate $x_{k|k}$.

A forecast horizon of n time steps is declared. For notational convenience, following arrays are defined:

$$X = [x'_{k+1}, x'_{k+2}, \ldots, x'_{k+\eta}]' \in \mathbb{R}^{n\eta \times 1} \quad (17)$$

$$U = [u'_{k+1}, u'_{k+2}, \ldots, u'_{k+\eta}]' \in \mathbb{R}^{m\eta \times 1}$$

X, not to be confused with ensemble estimates $\hat{X}_{k|k}$ of (11)-(13), stores the forecasts for the process state over the horizon, and U stores the forecasts for the process inputs over the same horizon. As stated previously, MPC jointly optimizes both X and U such that the values of $x_k$ conform to $r_k$ as good as possible over the horizon while respecting constraints on $x_k$, $u_k$, and hyperparameter selection. The ultimate output of the MPC algorithm are the forecasted values of $u_k$, U. The algorithm passes $u_{k+1}$ as determined by MPC into the process at the next time step, then throws out the remaining values in U. The whole optimization is carried out at the next time step. This is done because a finite, and usually small, G causes forecast accuracy to rapidly degrade beyond the first few time steps.

The optimization problem is described in equation (18). The cost function, J, is the energy associated with both error between $x_k$ and $r_k$, and $u_k$. The underlying logic is that sending unbounded quantities of energy into the process via $u_k$ will drive $x_k$ to $r_k$ with unbounded speed, but it will also destroy the machinery. Cost penalties on the energy of $u_k$ must be included along with penalties for non-compliance with $r_k$. The matrices $Q_j$, $T_j$, and H are hyperparameters that weight the relative severity of tracking error and control signal energy in the cost function. The vectors $x_{lb}$, $x_{ub}$, $u_{lb}$, and $u_{ub}$ store the lower and upper bounds on the values of each component of $x_k$ and $u_k$, respectively, which we assume remain constant at every time step.

$$\min_{X,U} J = \sum_{j=1}^{\eta-1}\left((x_{k+j} - r_{k+j})'Q_j(x_{k+j} - r_{k+j}) + u'_{k+j}T_j u_{k+j}\right) + \quad (18)$$
$$\cdots (x_{k+\eta} - r_{k+\eta})'H(x_{k+\eta} - r_{k+\eta}) + u'_{k+\eta}T_\eta u_{k+\eta}$$
$$\text{subject to } x_{k+j} = A_d x_{k+j-1} + B_d u_{k+j} \forall\, j \in [1, \eta]$$
$$x_k = \hat{x}_{k|k} \text{ from EnKF}$$
$$x_{lb} \le x_{k+j} \le x_{ub} \forall\, j \in [1, \eta]$$
$$u_{lb} \le u_{k+j} \le u_{ub} \forall\, j \in [1, \eta].$$

Both the cost function and constraints of equation (18) are convex. This allows us to rephrase equation (18) in the form shown below, which permits highly efficient solutions.

$$\min_\zeta J = \zeta' M \zeta + f\zeta \quad (19)$$
$$\text{subject to } D\zeta = b$$
$$GZ \le e,$$

Here, $\zeta = [X', U']' \in \mathbb{R}^{\eta(n+m)\times 1}$, and the arrays M, f, D, b, G, and e are defined below. In these definitions, the notation $X = \text{diag}(Y_1, Y_2, \ldots)$ denotes a block-diagonal matrix with the matrices $Y_1, Y_2, \ldots$ on the main diagonal.

$$M = \text{diag}(\tilde{Q}, \tilde{T})$$
$$\tilde{Q} = \text{diag}(Q_1, Q_2, \ldots, Q_{\eta-1}, H)$$
$$\tilde{T} = \text{diag}(T_1, T_2, \ldots, T_\eta)$$
$$r = [f_X \cdot 0_{1\times gen}]$$
$$f_X = -2[r'_{k-1}Q_1 \cdot r'_{k-2}Q_2, \ldots r'_{k-q-1}Q_{\eta-1} \cdot r'_{k-\eta}H]$$
$$D = [\tilde{A}\ \tilde{B}]$$
$$\tilde{A} = \begin{bmatrix} I_n & 0_n & 0_n & \cdots & 0_n & 0_n \\ -A_d & I_n & 0_n & \cdots & 0_n & 0_n \\ 0_n & -A_d & I_n & \cdots & 0_n & 0_n \\ \vdots & \vdots & \vdots & \ddots & \vdots & \vdots \\ 0_n & 0_n & 0_n & \cdots & -A_d & I_n \end{bmatrix} \} \eta \text{ blocks}$$
$$\tilde{B} = \text{diag}(-B_d, -B_d, \ldots -B_d)$$

$$b = \begin{bmatrix} A_d x_{k|\lambda} \\ 0_{n\times 1} \\ 0_{n\times 1} \\ \vdots \\ 0_{n\times 1} \end{bmatrix} \} \eta \text{ blocks}$$
$$G = \begin{bmatrix} I_{\eta(n+m)} \\ -I_{\eta(n+m)} \end{bmatrix}$$
$$e = \begin{bmatrix} \begin{pmatrix} X_{ub} \\ U_{ub} \end{pmatrix} \\ -\begin{pmatrix} X_{lb} \\ U_{lb} \end{pmatrix} \end{bmatrix}$$
$$X_{ub} = \begin{bmatrix} x_{ub} \\ x_{ub} \\ \vdots \\ x_{ub} \end{bmatrix} \} \eta \text{ blocks}$$
$$U_{ub} = \begin{bmatrix} u_{ub} \\ u_{ub} \\ \vdots \\ u_{ub} \end{bmatrix} \} \eta \text{ blocks}$$

(similar for $X_{lb}$ and $U_{lb}$)

An implementation of an MPC algorithm for an LTV embodiment is as follows. This begins with the LTV continuous-time model:

$$\dot{x}(t) = Ax(t) + B(t)u(t)\quad y(t) = C(t)x(t) \quad (20)$$

Unlike the LTI case, the components of $u(t) \in \mathbb{R}^m$ are parameters of the laser beam such as the beam power, radius, and position. $y(t) \in \mathbb{R}^p$ still collects the temperatures recorded in each pixel of an infrared (IR) camera, however we now presume the camera has a FOV that is centered around the laser position, and therefore moves with time. A describes heat conduction between nodes in the FEM mesh. B(t) maps the laser heat onto the relevant nodes in the mesh, and because these parameters are time-varying, so too is this matrix time-varying. C models the mapping between nodal temperatures and measurements, which is time-varying because the camera FOV changes with time. As before, we discretize equation (20) via equation (15) to produce:

$$x_k = \underbrace{(I_n - \Delta t A)^{-1}}_{A_d}x_{k-1} + \underbrace{\Delta t(I_n - \Delta t A)^{-1}B(t_k)}_{B_k}u_k \quad (21)$$
$$y_k = C_k x_k$$

We drop the subscript "d" from the discrete-time B(t) for notational conciseness. As before, equation (21) is used as the basis for both the EnKF and MPC algorithms of FIG. 4. To run the MPC at time step k, we assume the EnKF has already generated the estimate $\hat{x}_{k|k}$.

As before, the forecast horizon of n time steps is declared. The MPC optimization variables X and U remain unchanged from equation (17), as does the overall methodology described above. Only a small modification to the optimization statement is necessary to incorporate equation (21), shown below. All arrays are the same as above.

$$\min_{X,U} J = \sum_{j=1}^{\eta-1}\left((x_{k+j} - r_{k+j})'Q_j(x_{k+j} - r_{k+1}) + u'_{k+j}T_j u_{k+j}\right) + \quad (22)$$
$$\cdots (x_{k+\eta} - r_{k+\eta})'H(x_{k+\eta} - r_{k+\eta}) + u_{k+\eta}T_\eta u_{k+\eta}$$

-continued
$$x_{k+j} = A_d x_{k+j-1} + B_{k+j} u_{k+j} \forall\, j \in [1, \eta]$$
subject to
$$x_k = \hat{x}_{k|k} \text{ from } EnKF$$
$$x_{lb} \le x_{k+j} \le x_{ub} \forall\, j \in [1, \eta]$$
$$u_{lb} \le u_{k+j} \le u_{ub} \forall\, j \in [1, \eta].$$

The convex optimization statement for the LTV MPC implementation is also just a slight modification of the LTI implementation. It is given below:

$$\min_{\zeta} J = \zeta' M \zeta + f \zeta \qquad (23)$$

subject to $D\zeta = b$ $GZ \le e,$ $M = \mathrm{diag}(\tilde{Q}, \tilde{T})$ $\tilde{Q} = \mathrm{diag}(Q_1, Q_2, \ldots, Q_{\eta-1}, H)$ $\tilde{T} = \mathrm{diag}(T_1, T_2, \ldots, T_\eta)$ $f = [f_X \cdot 0_{1 \times gen}]$ $f_X = -2[r'_{k-1} Q_1 \cdot r'_{k-2} Q_2, \ldots r'_{k-q-1} Q_{\eta-1} \cdot r'_{k-\eta} H]$ $D = [\tilde{A}\ \tilde{B}]$ $$\tilde{A} = \begin{bmatrix} I_n & 0_n & 0_n & \cdots & 0_n & 0_n \\ -A_d & I_n & 0_n & \cdots & 0_n & 0_n \\ 0_n & -A_d & 1_n & \cdots & 0_n & 0_n \\ \vdots & \vdots & \vdots & \ddots & \vdots & \vdots \\ 0_n & 0_n & 0_n & \cdots & -A_d & I_n \end{bmatrix} \} \eta \text{ blocks}$$

$\tilde{B} = \mathrm{diag}(-B_d, -B_d, \ldots, -B_d)$ $$b = \begin{bmatrix} A_d \hat{x}_{k|\lambda} \\ 0_{n \times 1} \\ 0_{n \times 1} \\ \vdots \\ 0_{n \times 1} \end{bmatrix} \} \eta \text{ blocks}$$

$$G = \begin{bmatrix} I_{\eta(n+m)} \\ -I_{\eta(n+m)} \end{bmatrix}$$

$$e = \begin{bmatrix} \begin{pmatrix} X_{ub} \\ U_{ub} \end{pmatrix} \\ -\begin{pmatrix} X_{lb} \\ U_{lb} \end{pmatrix} \end{bmatrix}$$

$$X_{ub} = \begin{bmatrix} x_{ub} \\ x_{ub} \\ \vdots \\ x_{ub} \end{bmatrix} \} \eta \text{ blocks}$$

$$U_{ub} = \begin{bmatrix} u_{ub} \\ u_{ub} \\ \vdots \\ u_{ub} \end{bmatrix} \} \eta \text{ blocks}$$

(similar for $X_{lb}$, and $U_{lb}$)

Figure 5:
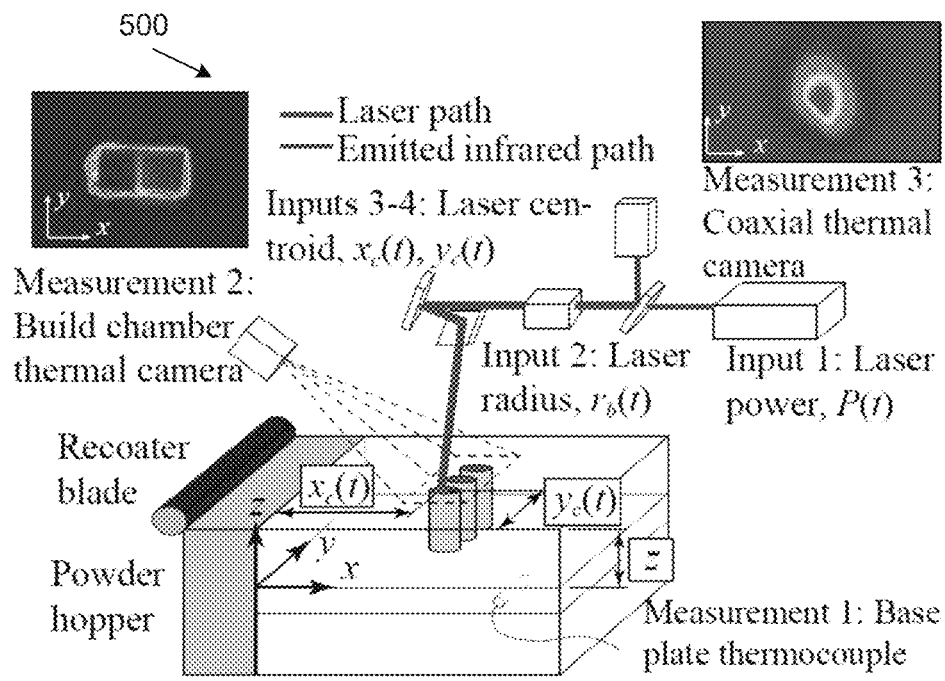
FIG. 5 illustrates an example system schematic of Powder bed fusion (PBF) additive manufacturing having input and output channels for L-PBF and E-PBF with a slow raster speed.

As noted above, Powder Bed Fusion (BPF) is an additive manufacturing process. The process occurs in three stages: 1) Sweep a layer of powder atop the build plate or an existing layer of powder, 2) sinter a pattern of 2D geometry into the laser with a laser (L-PBF) or electron beam (E-PBF), and 3) index the build platform in the −z direction to accommodate a new layer of powder, thus restarting the cycle. The experimental results that follow focus on L-PBF, which is shown schematically in FIG. 5, hereafter referred to simply as "PBF." In particular, FIG. 5 illustrates a system schematic 500 of Powder bed fusion (PBF) additive manufacturing having input and output channels for L-PBF and E-PBF with a slow raster speed.

Many defects in conventional approaches are a direct consequence of improper thermal management during the process, and could be mitigated by controlling the temperature field during building. Such in-situ control is denoted "feedback control" or closed loop (CL) control, and the corresponding process a CL process or system. This is an improvement over industry-standard means of PBF process control, which rely on setting a schedule of nominal process inputs and only controlling the process to make sure the schedule of nominal inputs are followed. Setting nominal process inputs without further in-situ correction is denoted open loop (OL) control, and the corresponding process an OL process or system.

Traditionally, CL control of the PBF temperature field is done by proxy. There exist many instances of researchers applying CL control to the PBF melt pool width, depth, or height. Since melt pool geometry is a function of temperature, controlling the geometry is indirect control of the temperature field. However, such methods lack the precision to control gradients within the melt pool itself, which drive many defects and process physics. Emerging techniques formulate purely correlative or machine learning-guided algorithms for direct control of the temperature field. However, these methods require gathering exhaustive training data sets. Applying model-based control, as in the melt pool geometry case, to direct temperature field control would circumvent this limitation, were it not for restrictions placed on PBF process actuation. For example, the PBF laser power and PBF laser radius control inputs (Inputs 1 and 2, FIG. 5) cannot be negative. Such restrictions challenge most model-based control algorithms.

The results provided below illustrate that the subject matter of the present disclosure accommodates actuator restrictions by using Model Predictive Control (MPC) as the model-based control algorithm, which easily accommodates a variety of imposed constraints on the process actuators and allowable range of dynamics. In simulation, we test the ability of MPC to enforce compliance between the temperature field produced by simplified PBF process dynamics and a desired temperature field. Accuracy in tracking the desired field is quantified relative to the tracking error of a simulated OL system using a fixed schedule of process inputs. Knowledge of the current temperature field, necessary for MPC to function, is gathered from a simulated infrared (IR) camera. Since the camera cannot image all of the temperature field, and Ensemble Kalman Filter (EnKF) is used to estimate the field based on the measurements and a linearized process model.

Experimental Procedures

Figure 6:
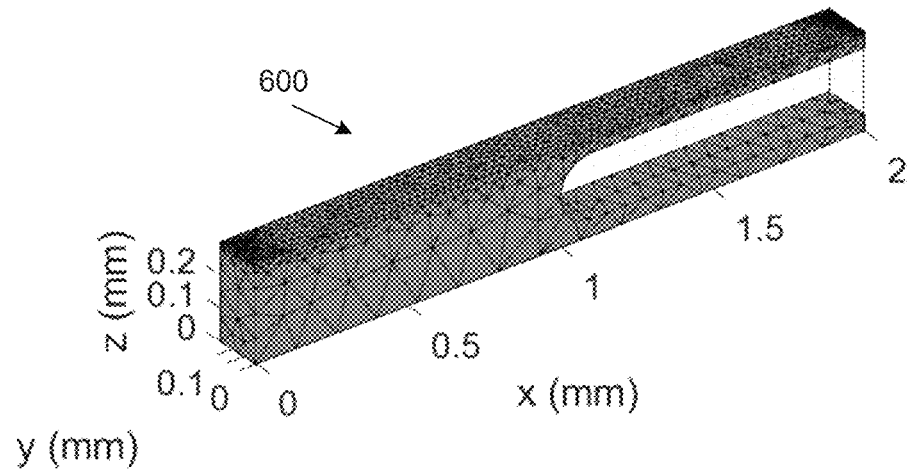
FIG. 6 illustrates an example simulation geometry.

The simulation uses the geometry 600 of FIG. 6 and the material properties of Table 1. All properties correspond to linear least-squares fits, assuming linear models. Reference properties represent Inconel 718 at the solidus temperature, 1255° C. Linear model properties represent Inconel 718 at 25° C. Closed loop properties are the average of these. This material properties mismatch represents the linear model having inaccurate knowledge of the "real" (closed loop) system properties, even as equation (18) enforces compliance with a reference temperature field that is correlated with desired thermophysical properties.

The nominal laser trajectory is governed by the parameters of Table 2. Here, rastering is performed in the x-direction, and $\Delta x_{sky}$ is the skywriting length per turnaround. The total distance traveled in the x-direction is 3 mm. During skywriting, the laser is turned off. These properties are "realistic" in that they produce fully-dense material according to the $\Delta H/h_s < 30$ criteria evaluated with the properties labeled "reference" in Table 1. $\eta=0.5$ is used as a representative value, as reported values of $\eta$ for Inconel 718 vary in the 0.3-0.9, and vary with laser type.

TABLE 1

Material Properties sets

| System | K [W$^1$m$^{-1}$K$^{-1}$] | c [J$^1$kg$^{-1}$K$^{-1}$] | $\rho$ [kg$^1$m$^{-3}$] |
|---|---|---|---|
| Reference | 31.2 | 659 | 7734 |
| Linear Model | 10.6 | 543 | 8260 |
| Closed Loop | 20.9 | 601 | 7997 |

TABLE 2

Laser scan parameters

| Parameter | Symbol and unit | Value |
|---|---|---|
| Power | W (watt) | 150 |
| Absorptivity | $\eta$ (—) | 0.5 |
| Beam radius | $r_b$ (μm) | 50 |
| Laser speed | v (mm/s) | 950 |
| Hatch spacing | h (μm) | 50 |
| Skywriting length | $\Delta x_{sky}$ (mm) | 0.5 |

Figure 7:
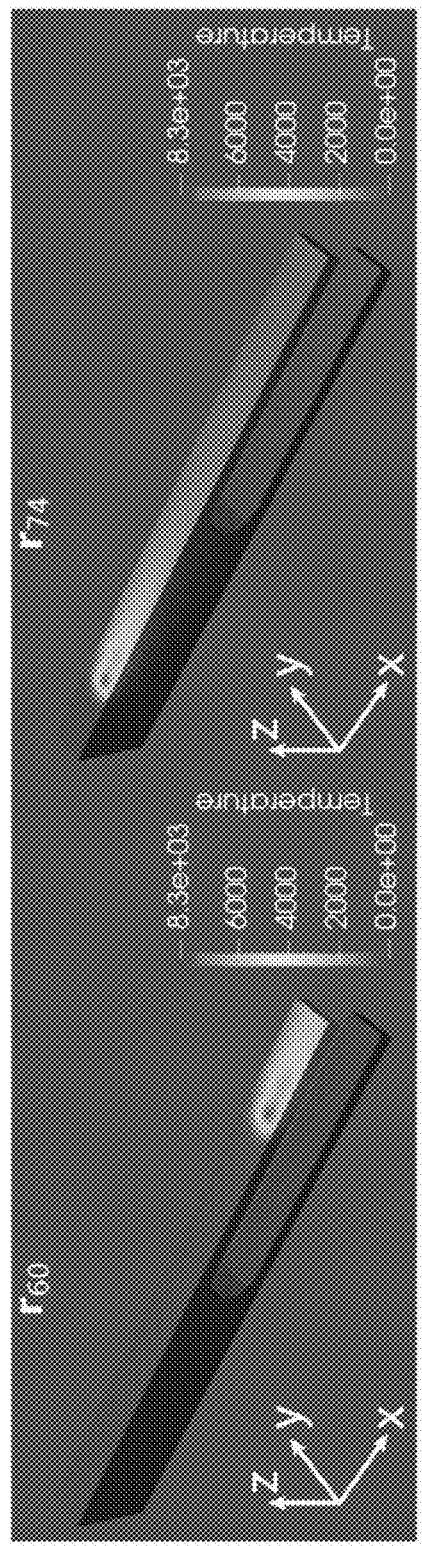
FIG. 7 illustrates representative frames of a reference temperature field, $r_k$.

The reference temperature field, $r_k$, is based on the Green's Function solution to conductive heat transfer over an infinite half-plane. As shown in FIG. 7, this reference field produces a uniform melt pool geometry regardless of the laser's location within $\Omega$. To achieve this effect, $r_k$ is constructed without turning off the laser when skywriting, such that the melt pool geometry remains constant as the laser moves off $\Omega$. Supposing in a real production environment, this geometry is correlated with fully-dense material with the desired engineering specifications, then accurate tracking of $r_k$ implies a qualified part. However, in many respects, $r_k$ is an unrealizable ideal. For example, as the laser passes near the part edge, the melt pool will be distorted because the powder acts as insulation. The role of equation (18) is to force the system to track $r_k$ as accurately as possible while respecting the physical constraints of the system. We denote the MPC-controlled temperature field as the CL temperature field, $x_{CL,k}$, and the corresponding controlled process inputs as $u_{CL}(t)$.

The Finite Element Method (FEM) is used to propagate a discretizion through equation (1) to form:

$$\dot{x}(t)=Ax(t)+L(t,u), \quad (24)$$

where A describes heat propagation between nodes in V and L(t,u) distributes the heat flux onto the nodes. L(t,u) of equation (24) is linearized as in equation (2), assuming that the available control inputs are P(t) (Input 1, FIG. 5) and $r_b(t)$ (Input 2, FIG. 5), i.e. $u=u(t,P(t),r_b(t))$.

To quantify MPC performance, the open loop (OL) system is first defined. This is an instance of equation (24) with the closed loop material properties of Table 2, but using the nominal process inputs (Table 1), denoted $u_{OL}(t)$, instead of the MPC-controlled inputs. Doing so produces the temperature field $x_{OL,k}$. By comparing the error magnitudes between $r_k$, and $x_{CL,k}$ and $x_{OL,k}$, we quantify the relative reduction in error produced by the MPC. Error magnitudes are determined in the 2-norm and $\infty$-norm sense $$\text{Error 2-norms:} \begin{cases} \tilde{x}_{2,OL}(t_k) = \|r_k - x_{OL,k}\|_2 \\ \tilde{x}_{2,KF}(t_k) = \|r_k - \hat{x}_{k|k}\|_2 \\ \tilde{x}_{2,CL}(t_k) = \|r_k - x_{CL,k}\|_2 \end{cases}$$

$$\text{Error } \infty\text{-norms:} \begin{cases} \tilde{x}_{\infty,OL}(t_k) = \|r_k - x_{OL,k}\|_\infty \\ \tilde{x}_{\infty,KF}(t_k) = \|r_k - \hat{x}_{k|k}\|_\infty \\ \tilde{x}_{\infty,CL}(t_k) = \|r_k - x_{CL,k}\|_\infty \end{cases}$$

Taking the norms of these norms to reduce the error signals to scalar quantities that can be used as performance metric $$\text{2-norm of the 2-norm:} \begin{cases} \|\tilde{x}_{\infty,OL}(t_k)\|_\infty \\ \|\tilde{x}_{2,KF}(t_k)\|_2 \\ \|\tilde{x}_{\infty,CL}(t_k)\|_\infty \end{cases}$$

$$\infty\text{-norm of the }\infty\text{-norm:} \begin{cases} \|\tilde{x}_{\infty,OL}(t_k)\|_\infty \\ \|\tilde{x}_{2,KF}(t_k)\|_\infty \\ \|\tilde{x}_{\infty,CL}(t_k)\|_\infty \end{cases}$$

$$\|\hat{e}\|_{2,KF} = \frac{\text{abs}(\|\tilde{x}_{2,KF}(t_k)\|_2 - \|\tilde{x}_{2,OL}(t_k)\|_2)}{\|\tilde{x}_{2,OL}(t_k)\|_2}$$

$$\|\hat{e}\|_{\infty,KF} = \frac{\text{abs}(\|\tilde{x}_{\infty,KF}(t_k)\|_\infty - \|\tilde{x}_{\infty,OL}(t_k)\|_\infty)}{\|\tilde{x}_{\infty,OL}(t_k)\|_\infty}$$

$$\|\hat{e}\|_{2,CL} = \frac{\text{abs}(\|\tilde{x}_{2,CL}(t_k)\|_2 - \|\tilde{x}_{2,OL}(t_k)\|_2)}{\|\tilde{x}_{2,OL}(t_k)\|_2}$$

$$\|\hat{e}\|_{\infty,CL} = \frac{\text{abs}(\|\tilde{x}_{\infty,CL}(t_k)\|_\infty - \|\tilde{x}_{\infty,OL}(t_k)\|_\infty)}{\|\tilde{x}_{\infty,OL}(t_k)\|_\infty}$$

The metrics $\|\hat{e}\|_2$ and $\|\hat{e}\|_\infty$ measure the reduction in tracking error produced by the MPC, relative to the OL temperature field, in both the 2-norm sense (reduction in overall error) and $\infty$-norm sense (reduction in absolute maximum error at any time step). We measure the tracking error of the EnKF-estimated temperature field in addition to the CL temperature field to quantify the ability of the MPC to recover good tracking in the presence of erroneous estimations.

The error metrics $\|e\|_2$ and $\|e\|_\infty$ . . . are bulk measurements of MPC efficacy. To help explain these metrics, we compare $r_k$, $x_{OL,k}$, $\hat{x}_{k,k}$, and $x_{CL,k}$ at the four points shown in FIG. 8. These points, tabulated in Table 3, simulate embedding thermocouples (TCs) within V and comparing estimations with experimental measurements at the corresponding locations. The temperature fields were interpolated onto the locations of Table 3 via a linear tetrahedrization method. In brief, the FEM element containing each TC is identified, and the temperature at the TC location is interpolated from the nodal temperatures using the volume coordinates of the point within that element.

TABLE 3

Figure 8:
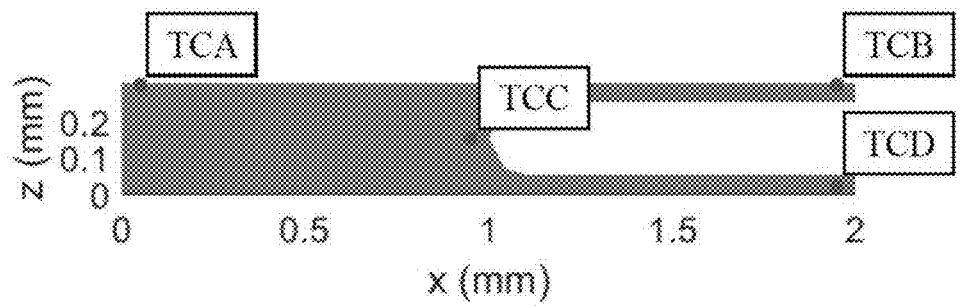
FIG. 8 illustrates example simulated thermocouple (TC) measurement locations during testing. Immersion depth for all locations is 75 μm, or halfway into the y-direction footprint of V.

Locations of the sample points shown in FIG. 8.

| Dimension | TCA | TCB | TCC | TCD |
|---|---|---|---|---|
| x | 0.05 | 1.95 | 0.95 | 1.95 |
| y | 0.075 | 0.075 | 0.075 | 0.075 |
| z | 0.295 | 0.295 | 0.15 | 0.020 |

Experimental Results

TABLE 4

Normalized norms-of-norms of $\tilde{x}_{KF,k}$ and $\tilde{x}_{CL,k}$. All norms have units ° C.

| System | $\|\tilde{x}_2(t_k)\|_2$ | $\|\hat{e}\|_2$ | $\|\tilde{x}_\infty(t_k)\|_\infty$ | $\|\hat{e}\|_\infty$ |
|---|---|---|---|---|
| KF | $3.03 \times 10^7$ | 1.88 | $2.66 \times 10^6$ | 27.9 |
| CL | $3.56 \times 10^6$ | 0.66 | $3.87 \times 10^4$ | 0.58 |
| OL | $1.05 \times 10^7$ | | $9.2245 \times 10^4$ | |

Figure 9:
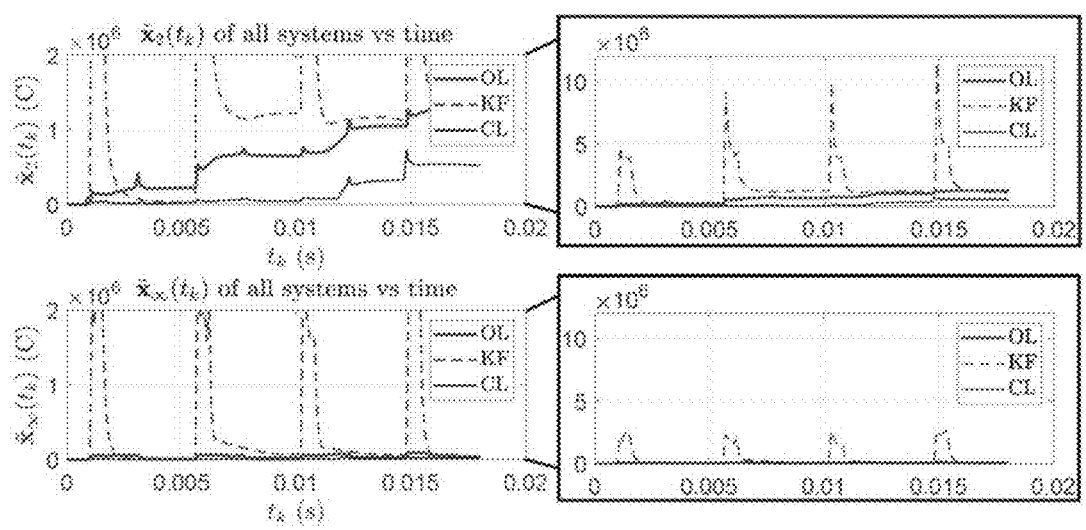
FIG. 9 illustrates $\tilde{x}_2(t_k)$ and $\tilde{x}^\infty(t_k)$ for three example systems.
Figure 10A:
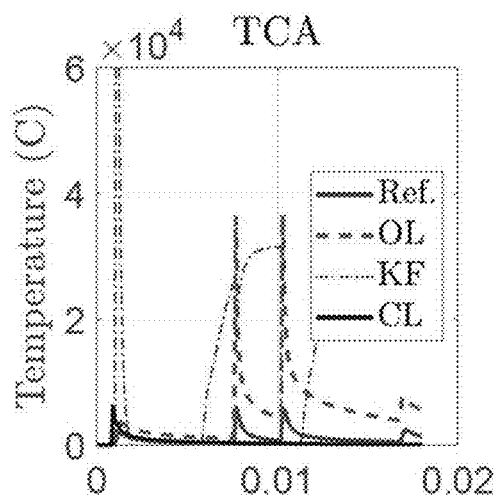
FIGS. 10A-10D illustrate temperatures at location within V.
Figure 10B:
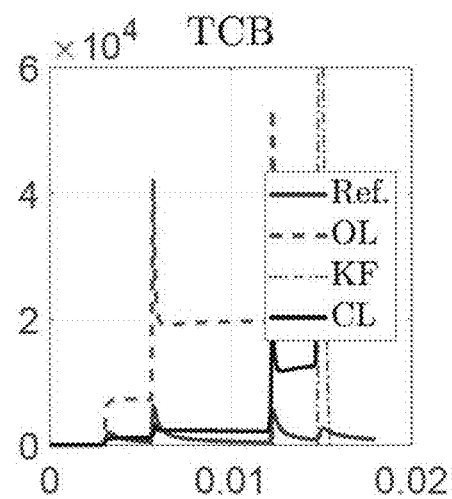
Figure 10C:
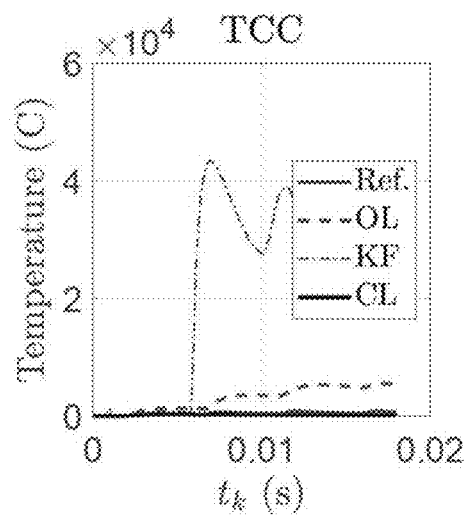
Figure 10D:
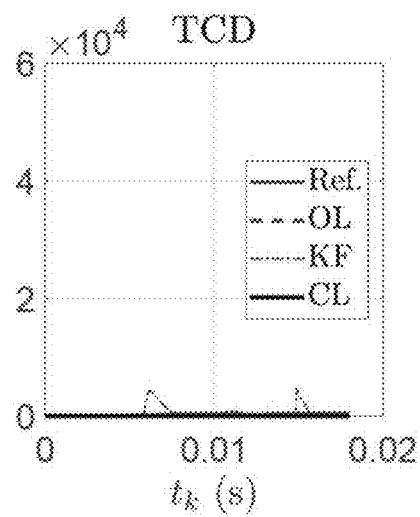
Figure 11A:
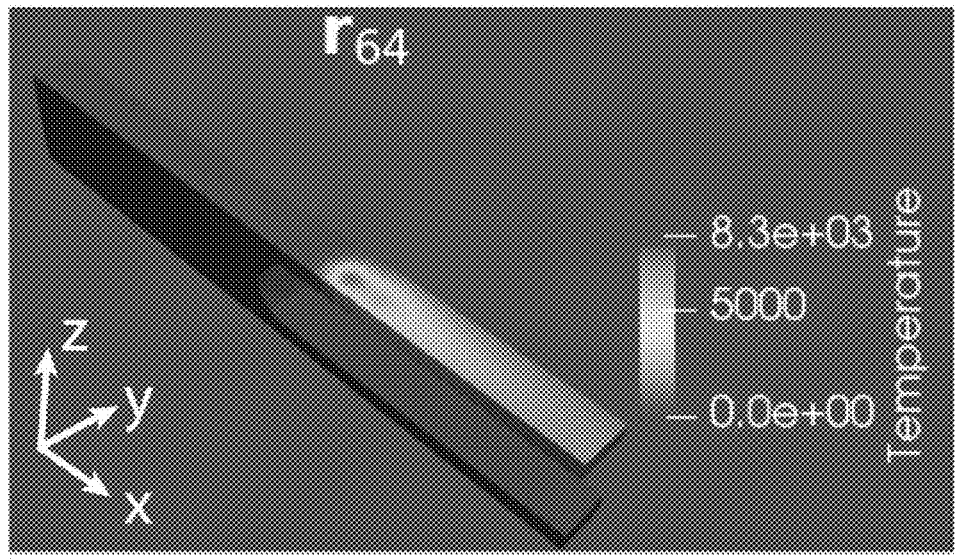
FIGS. 11A-11C illustrates a representative frame from $r_k$, $\tilde{x}_{k|k}$, and $x_{CL,k}$, where, k=64.
Figure 11B:
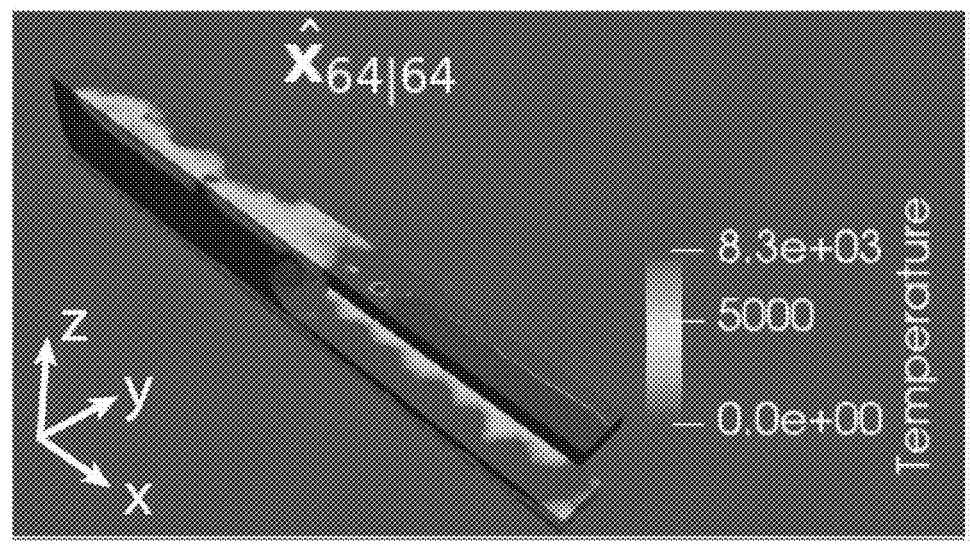
Figure 11C:
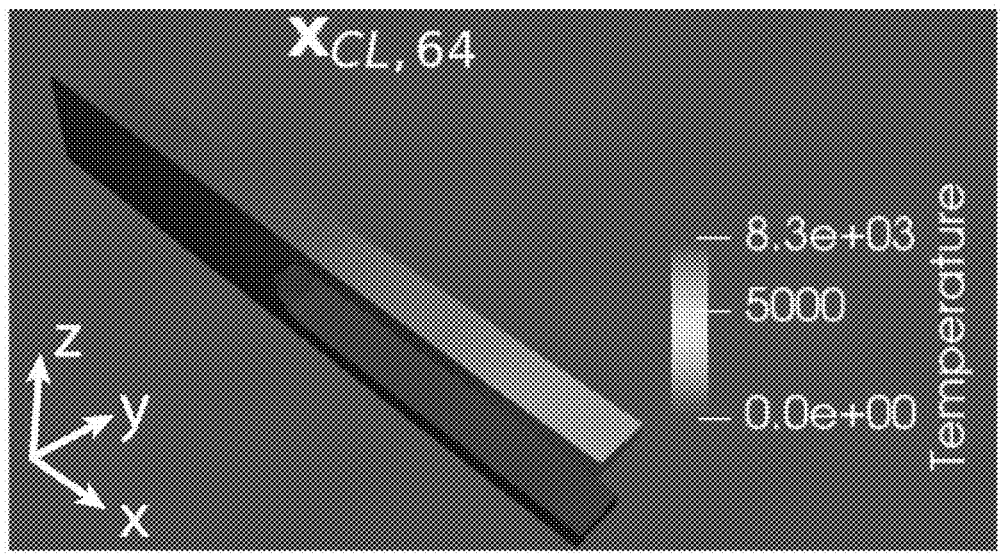

FIG. 9 shows $\tilde{x}_2(t_k)$ and $\tilde{x}(t_k)$ for all 3 systems. Immediately apparent is the failure of the EnKF to accurately estimate $x_{CL,k}$. This is also observed in FIGS. 10A-10D, wherein the values of $\hat{x}_{k|k}$ at the locations of Table 3 are wildly inaccurate, and in FIGS. 11A-11C, wherein $\hat{x}_{k|k}$ bears no resemblance to a realistic melt pool. However, despite the inaccuracy in $\hat{x}_{k|k}$, Table 4 shows that $\|\hat{e}\|_{2,CL} < 1$, meaning that application of MPC reduced error in tracking $r_k$ relative to $x_{OL,K}$. We consider this a great demonstration of the robustness of MPC.

Despite the net reduction in 2-norm error, $\|\hat{e}\|_{\infty,CL} > 1$. This means that for at least one k, $\tilde{x}_{\infty,CL}(t_k) > \tilde{x}_{\infty,OL}(t_k)$. Consulting FIG. 9, we see this happened twice near $t_k = 0.015$ s. However, despite momentary degradation in tracking efficacy, for the rest of the simulation, improvements in tracking efficiency are sufficiently large to compensate. Essentially, the controller detects a severe loss in tracking accuracy and self-corrects.

Figure 12:
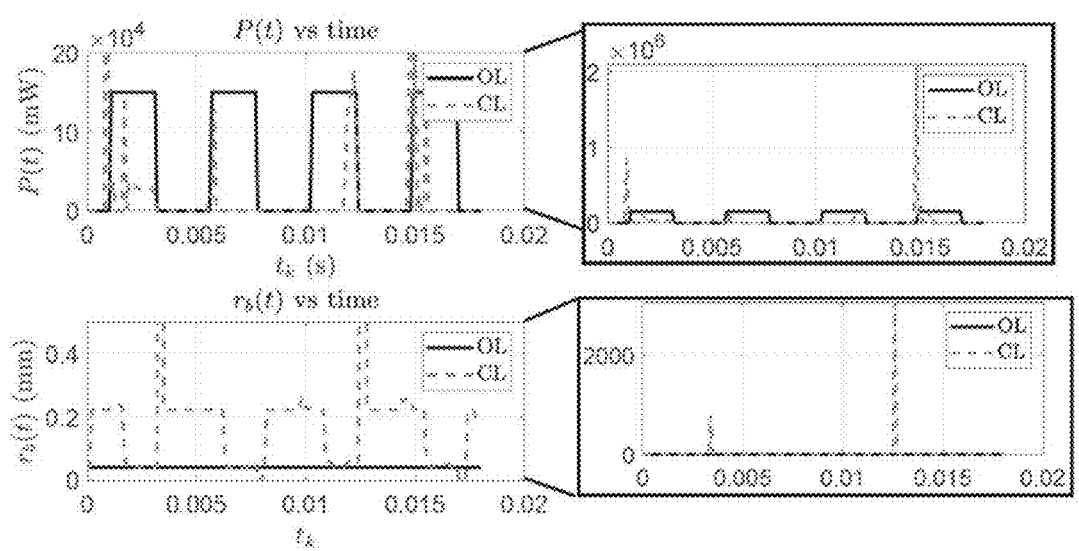
FIG. 12 shows that the MPC commands the laser to deactivate for almost all the times when the open loop (OL) control is active.

These measures of accuracy are relative. $x_{CL,k}$ shown in FIGS. 11A-11C do not correspond to a realistic melt pool in absolute terms. However, this is not because MPC failed. It is because, as stated above, tracking $r_k$ accurately cannot be done. As the laser passes over the "fork" of the part (FIGS. 11A-11C), the model of MPC predicts that any non-zero application of heat would cause unacceptable overheating, based on the estimated current temperatures $\hat{x}_{k|k}$. In response, it simply turns the laser off, which produces the smooth linear temperature gradients in $x_{CL,k}$ in FIGS. 11A-11C. Essentially, MPC judges that the error produced by deactivating the laser is the smallest possible error, since the part is already overheated and any positive application of heat would make the overheating worse. FIG. 12 shows that MPC commands the laser to deactivate for almost all the times when the OL control is active. Were the constraints on U disabled and negative inputs allowed, MPC would command P(t) and $r_b$(t) to assume negative values and siphon away heat. However, such negative inputs cannot be realized on physical PBF hardware. If excess heat is detected, all the controller can do is deactivate the laser and wait for ambient conduction to remove the heat. For parts with pronounced overhangs like in FIG. 6, ambient cooling is slow and thus heavily constrains controller performance. From this observation, we conclude that there is a limit to how close to $1\|\hat{e}\|_{2,CL}$ may grow, due to limitations on what the controller can accomplish imposed by hardware restrictions. To further reduce $\tilde{x}_{2,CL}$, the controller would need to include live adjustments to the scan strategy as part of the control algorithm, or the PBF machine would need additional actuators for venting excess heat from the build.

FIG. 13 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 13, an exemplary system for implementing aspects described herein includes a computing device, such as computing device 1300. In its most basic configuration, computing device 1300 typically includes at least one processing unit 1302 and memory 1304. Depending on the exact configuration and type of computing device, memory 1304 may be volatile (such as random access memory (RAM)), non-volatile (such as read-only memory (ROM), flash memory, etc.), or some combination of the two. This most basic configuration is illustrated in FIG. 13 by dashed line 1306.

Computing device 1300 may have additional features/functionality. For example, computing device 1300 may include additional storage (removable and/or non-removable) including, but not limited to, magnetic or optical disks or tape. Such additional storage is illustrated in FIG. 13 by removable storage 1308 and non-removable storage 1310.

Computing device 1300 typically includes a variety of computer readable media. Computer readable media can be any available media that can be accessed by the device 1300 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1304, removable storage 1308, and non-removable storage 1310 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1300. Any such computer storage media may be part of computing device 1300.

Computing device 1300 may contain communication connection(s) 1312 that allow the device to communicate with other devices. Computing device 1300 may also have input device(s) 1314 such as a keyboard, mouse, pen, voice input device, touch input device, etc. Output device(s) 1316 such as a display, speakers, printer, etc. may also be included. All these devices are well known in the art and need not be discussed at length here.

In an implementation, a method of estimating the temperature distribution inside a part manufactured by powder bed fusion is provided. The method comprises: discretizing the part geometry into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations; estimating the values of the variable set using a Kalman filter, using the set of ordinary differential equations, information on heat applied, an estimate of a noise distribution of the process, a measurement of a temperature of the part during the process at specific locations, and an estimate of a noise distribution in the temperature measurement; and outputting an estimate of the set of variables.

Implementations may include some or all of the following features. The method further comprises: reducing the number of ordinary differential equations in the set of ordinary differential equations via a change in variables of the ordinary differential equations as a linear combination of the set of variables, thus providing a transformed variable set prior to estimating the values of the transformed variable set; and prior to outputting the estimate of the set of variables, computing the estimate of the set of variables by reversing the reduction of the number of ordinary differential equations. The discretizing comprises a finite element method. The discretizing comprises a finite volume method. The discretizing comprises a boundary element method. The reducing comprises residualization. The reducing comprises balanced truncation.

Implementations may include some or all of the following features. The method further comprises: prior to constructing the set of copies, reducing the number of ordinary differential equations in the set of ordinary differential equations via a change in variables of the ordinary differential equations as a linear combination of the set of variables, thus providing a transformed variable set; and prior to outputting the estimate of the set of variables, computing the estimate of the set of variables by reversing the reduction of the number of ordinary differential equations. The discretizing comprises a finite element method. The discretizing comprises a finite volume method. The discretizing comprises a boundary element method. The reducing comprises residualization. The reducing comprises balanced truncation.

In an implementation, a system for estimating the temperature distribution inside a part manufactured by powder bed fusion is provided. The system comprises: a processing module configured to: discretize a geometry of the part into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations; estimate the values of the variable set using a Kalman filter, using the set of ordinary differential equations, information on heat applied, an estimate of a noise distribution of the process, a measurement of a temperature of the part during the process at specific locations, and an estimate of a noise distribution in the temperature measurement; and an output module configured to output an estimate of the set of variables.

Implementations may include some or all of the following features. The processing module is further configured to: reduce the number of ordinary differential equations in the set of ordinary differential equations via a change in variables of the ordinary differential equations as a linear combination of the set of variables, thus providing a transformed variable set prior to estimating the values of the transformed variable set, and prior to outputting the estimate of the set of variables, compute the estimate of the set of variables by reversing the reduction of the number of ordinary differential equations. The discretizing uses an adaptive mesh that changes over time. The discretizing comprises a finite element method or a finite volume method. The discretizing comprises a boundary element method. The reducing comprises one of residualization or balanced truncation.

As used herein, the singular form "a," "an," and "the" include plural references unless the context clearly dictates otherwise.

As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

It should be understood that the various techniques described herein may be implemented in connection with hardware components or software components or, where appropriate, with a combination of both. Illustrative types of hardware components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of estimating the temperature distribution inside a part manufactured by powder bed fusion process, the method comprising:
    discretizing the part geometry into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations;
    estimating the values of the variable set using a Kalman filter, using the set of ordinary differential equations, information on heat applied, an estimate of a noise distribution of the process, a measurement of a temperature of the part during the process at specific locations, and an estimate of a noise distribution in the temperature measurement; and
    outputting an estimate of the set of variables to a model predictive control (MPC) to alter a set of control inputs to the power bed fusion process to drive the estimate to a predetermined target temperature field.

2. The method of claim 1, wherein a linear time-invariant (LTI) process is used to alter the control inputs.

3. The method of claim 2, wherein the LTI process model is described by:

$$\bar{x}(t)=Ax(t)+Bu(t)$$

$$y(t)=Cx(t)$$

wherein $u(t)\in \mathbb{R}^m$ represents heat applied to the exposed surfaces of all elements on face $\Omega$ in the mesh,
wherein $\Omega$ is the face of the part exposed to the laser (as described in the current application),
wherein $y(t)\in \mathbb{R}^p$ collects the temperatures recorded in each pixel of an infrared (IR) camera with a fixed FOV that covers all of $\Omega$, and
wherein A describes heat conduction between nodes in the FEM mesh, B maps the laser heat onto the relevant nodes in the mesh, and C models the mapping between nodal temperatures and measurements.

4. The method of claim 3, the MPC further comprising:
    declaring a first array X that stores forecasts for a process state over a forecast horizon of η time steps; and
    declaring a second array U that stores forecasts for the control inputs over the forecast horizon.

5. The method of claim 4, further comprising jointly optimizing both X and U such to conform to the predetermined target temperature field over the horizon.

6. The method of claim 4, further comprising jointly optimizing both X and U such to conform to the predetermined target temperature field over the horizon.

7. The method of claim 1, wherein a linear time-varying (LTV) process is used to alter the control inputs.

8. The method of claim 7, wherein the LTV process model is defined by:

$$\dot{x}(t)=Ax(t)+B(t)u(t)$$

$$y(t)=C(t)x(t)$$

wherein components of $u(t)\in \mathbb{R}^m$ are parameters of the laser beam, including beam power, radius, and position,
wherein $y(t)\in \mathbb{R}^p$ collects temperatures recorded in each pixel of an infrared (IR) camera that has a field of view (FOV) is centered around the laser position and moves with time,
wherein A describes heat conduction between nodes in the FEM mesh, B(t) maps the laser heat onto the relevant nodes in the mesh, and because these parameters are time-varying, so too is this matrix time-varying, and C(t) models the mapping between nodal temperatures and measurements, which is time-varying because the camera FOV changes with time.

9. The method of claim 8, the MPC further comprising:
    declaring a first array X that stores forecasts for a process state over a forecast horizon of η time steps; and
    declaring a second array U that stores forecasts for the control inputs over the forecast horizon.

10. The method of claim 1, wherein components of the control input differ based on if a linear time-invariant (LTI) or linear time-varying (LTV) process model is used.

11. A system for estimating the temperature distribution inside a part manufactured by powder bed fusion, the system comprising:
    a processing module configured to:
    discretize the part geometry into finite units to convert a thermal transport model for the part geometry into a set of ordinary differential equations that describes heat transport between elements, the discretizing defining a set of variables that represent temperature at specific spatial locations, using the thermal transport model and thermal properties of the part material as functions in the set of ordinary differential equations;
    estimate the values of the variable set using a Kalman filter, using the set of ordinary differential equations, information on heat applied, an estimate of a noise distribution of the process, a measurement of a temperature of the part during the process at specific locations, and an estimate of a noise distribution in the temperature measurement; and
    output an estimate of the set of variables to a model predictive control (MPC) to alter a set of control inputs to the power bed fusion process to drive the estimate to a predetermined target temperature field.

12. The system of claim 11, wherein a linear time-invariant (LTI) process is used to alter the control inputs.

13. The system of claim 12, wherein the LTI process model is described by:

$$\dot{x}(t)=Ax(t)+Bu(t)$$

$$y(t)=Cx(t)$$

wherein $u(t)\in \mathbb{R}^m$ represents heat applied to the exposed surfaces of all elements on face $\Omega$ in the mesh,
wherein $\Omega$ is the face of the part exposed to the laser (as described in the current application),
wherein $y(t)\in \mathbb{R}^p$ collects the temperatures recorded in each pixel of an infrared (IR) camera with a fixed FOV that covers all of $\Omega$, and
wherein A describes heat conduction between nodes in the FEM mesh, B maps the laser heat onto the relevant nodes in the mesh, and C models the mapping between nodal temperatures and measurements.

14. The system of claim 13, the processing module further configured to:
   declare a first array X that stores forecasts for a process state over a forecast horizon of η time steps; and
   declare a second array U that stores forecasts for the control inputs over the forecast horizon.

15. The system of claim 14, the processing module further configured to jointly optimize both X and U such to conform to the predetermined target temperature field over the horizon.

16. The system of claim 14, the processing module further configured to jointly optimize both X and U such to conform to the predetermined target temperature field over the horizon.

17. The method of claim 11, wherein a linear time-varying (LTV) process is used to alter the control inputs.

18. The system of claim 17, wherein the LTV process model is defined by:

$$\dot{x}(t) = Ax(t) + B(t)u(t)$$

$$y(t) = C(t)x(t)$$

wherein components of $u(t) \in \mathbb{R}^m$ are parameters of the laser beam, including beam power, radius, and position, wherein $y(t) \in \mathbb{R}^p$ collects temperatures recorded in each pixel of an infrared (IR) camera that has a field of view (FOV) is centered around the laser position and moves with time, wherein A describes heat conduction between nodes in the FEM mesh, B(t) maps the laser heat onto the relevant nodes in the mesh, and because these parameters are time-varying, so too is this matrix time-varying, and C(t) models the mapping between nodal temperatures and measurements, which is time-varying because the camera FOV changes with time.

19. The system of claim 18, the processing module further configured to:
   declare a first array X that stores forecasts for a process state over a forecast horizon of η time steps; and
   declare a second array U that stores forecasts for the control inputs over the forecast horizon.

20. The system of claim 11, wherein components of the control input differ based on if a linear time-invariant (LTI) or linear time-varying (LTV) process model is used.

\* \* \* \* \*